(12) United States Patent
Hashiba et al.

(10) Patent No.: US 10,451,358 B2
(45) Date of Patent: Oct. 22, 2019

(54) HEAT STORAGE SYSTEM

(71) Applicant: IHI Corporation, Tokyo (JP)

(72) Inventors: Michitaro Hashiba, Takasaki (JP); Ryo Akiyoshi, Kawasaki (JP)

(73) Assignee: IHI CORPORATION, Tokyo (JP)

( * ) Notice: Subject to any disclaimer, the term of this patent is extended or adjusted under 35 U.S.C. 154(b) by 154 days.

(21) Appl. No.: 15/809,711

(22) Filed: Nov. 10, 2017

(65) Prior Publication Data

US 2018/0066900 A1    Mar. 8, 2018

Related U.S. Application Data

(60) Division of application No. 14/939,097, filed on Nov. 12, 2015, now abandoned, which is a continuation of
(Continued)

(30) Foreign Application Priority Data

May 17, 2013  (JP) .................................. 2013-105262

(51) Int. Cl.
*F28D 20/02* (2006.01)
*F24S 60/10* (2018.01)
(Continued)

(52) U.S. Cl.
CPC ............ *F28D 20/028* (2013.01); *C09K 5/063* (2013.01); *F24S 60/10* (2018.05);
(Continued)

(58) Field of Classification Search
CPC ...................... F28D 20/028; F28D 2020/0069
See application file for complete search history.

(56) References Cited

U.S. PATENT DOCUMENTS 4,249,592 A    2/1981  Greene
4,262,735 A *  4/1981  Courrege ................ F03G 6/067
                                                        126/641
(Continued)

FOREIGN PATENT DOCUMENTS

CN    103017368 A    4/2013
JP    59-113694 U    8/1984
(Continued)

OTHER PUBLICATIONS

Extended European Search Report dated Jan. 17, 2018 in corresponding EP Patent Application No. 17188311.9 (7 pages).
(Continued)

*Primary Examiner* — Hung Q Nguyen
*Assistant Examiner* — Mark L. Greene
(74) *Attorney, Agent, or Firm* — Rothwell, Figg, Ernst & Manbeck, P.C.

(57) ABSTRACT

A heat storage system is provided that is capable of being manufactured at lower cost and has higher heat transmission efficiency. A heat storage system includes a heat storage material having a higher specific gravity in a solid phase than in a liquid phase, a heat storage tank for containing the heat storage material, a cooling side heat exchanger arranged at an upper section inside the heat storage tank and for cooling the heat storage material, a heating side heat exchanger arranged at a lower section inside the heat storage tank and for heating the heat storage material, and a wall surface heater for heating a side wall of the heat storage tank.

2 Claims, 16 Drawing Sheets

Related U.S. Application Data application No. PCT/JP2014/059294, filed on Mar. 28, 2014.

(51) Int. Cl.

| | | |
|---|---|---|
| *C09K 5/06* | (2006.01) | |
| *F28D 20/00* | (2006.01) | |
| *F28F 19/00* | (2006.01) | |
| *F28F 19/02* | (2006.01) | |
| *F28G 1/08* | (2006.01) | |
| *F28G 1/12* | (2006.01) | |
| *F28G 1/16* | (2006.01) | |
| *F28F 23/00* | (2006.01) | |
| *F28D 1/047* | (2006.01) | |
| *F28D 1/06* | (2006.01) | |

(52) U.S. Cl.
CPC ....... *F28D 20/0034* (2013.01); *F28D 20/021* (2013.01); *F28F 19/00* (2013.01); *F28F 19/02* (2013.01); *F28F 23/00* (2013.01); *F28G 1/08* (2013.01); *F28G 1/12* (2013.01); *F28G 1/166* (2013.01); *F28D 1/0477* (2013.01); *F28D 1/06* (2013.01); *F28D 20/0039* (2013.01); *F28D 2020/0047* (2013.01); *F28D 2020/0069* (2013.01); *Y02E 60/142* (2013.01); *Y02E 60/145* (2013.01); *Y02P 20/124* (2015.11)

(56) References Cited

U.S. PATENT DOCUMENTS

| 6,253,567 | B1 | 7/2001 | Imanari et al. |
|---|---|---|---|
| 2002/0104641 | A1 | 8/2002 | Searls et al. |
| 2009/0194257 | A1* | 8/2009 | Niu ..................... F28D 15/00 165/104.17 |
| 2009/0211726 | A1 | 8/2009 | Bank et al. |
| 2011/0083436 | A1 | 4/2011 | White et al. |
| 2013/0104549 | A1* | 5/2013 | Stiesdal .................... F02C 6/14 60/659 |
| 2016/0060499 | A1 | 3/2016 | Hashiba et al. |

FOREIGN PATENT DOCUMENTS

| JP | 59-173699 A | 10/1984 |
|---|---|---|
| JP | 1-15800 B2 | 3/1989 |
| JP | 5-203201 A | 8/1993 |
| JP | 5-256591 A | 10/1993 |
| JP | 10-325656 A | 12/1998 |
| JP | 2850264 B2 | 1/1999 |
| JP | 11-44494 A | 2/1999 |
| JP | 11-63580 A | 3/1999 |
| JP | 11-211389 A | 8/1999 |
| JP | 11-294983 A | 10/1999 |
| JP | 2001-4290 A | 1/2001 |
| JP | 2004-225964 A | 8/2004 |
| JP | 2007-107773 A | 4/2007 |
| JP | 2007-204517 A | 8/2007 |
| JP | 2008-175189 A | 7/2008 |
| JP | 2011-524966 A | 9/2011 |
| JP | 2013-40224 A | 2/2013 |
| WO | 2009/148640 A2 | 12/2009 |

OTHER PUBLICATIONS

International Search Report dated Jun. 24, 2014 in PCT/JP2014/059294 (with an English translation) (6 pages).
Yasui, JP 59-173699, Oct. 1, 1984, English abstract.

\* cited by examiner

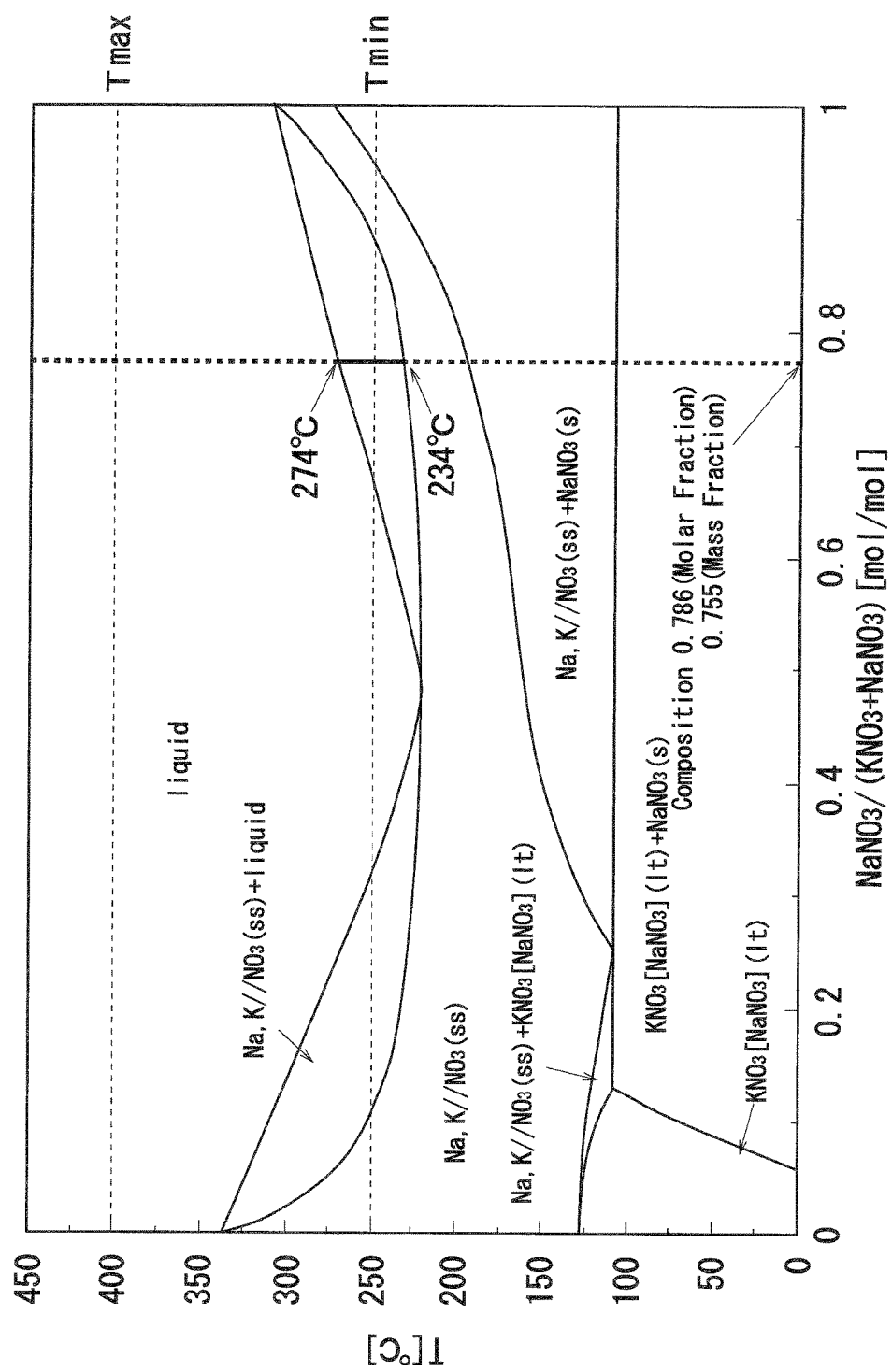

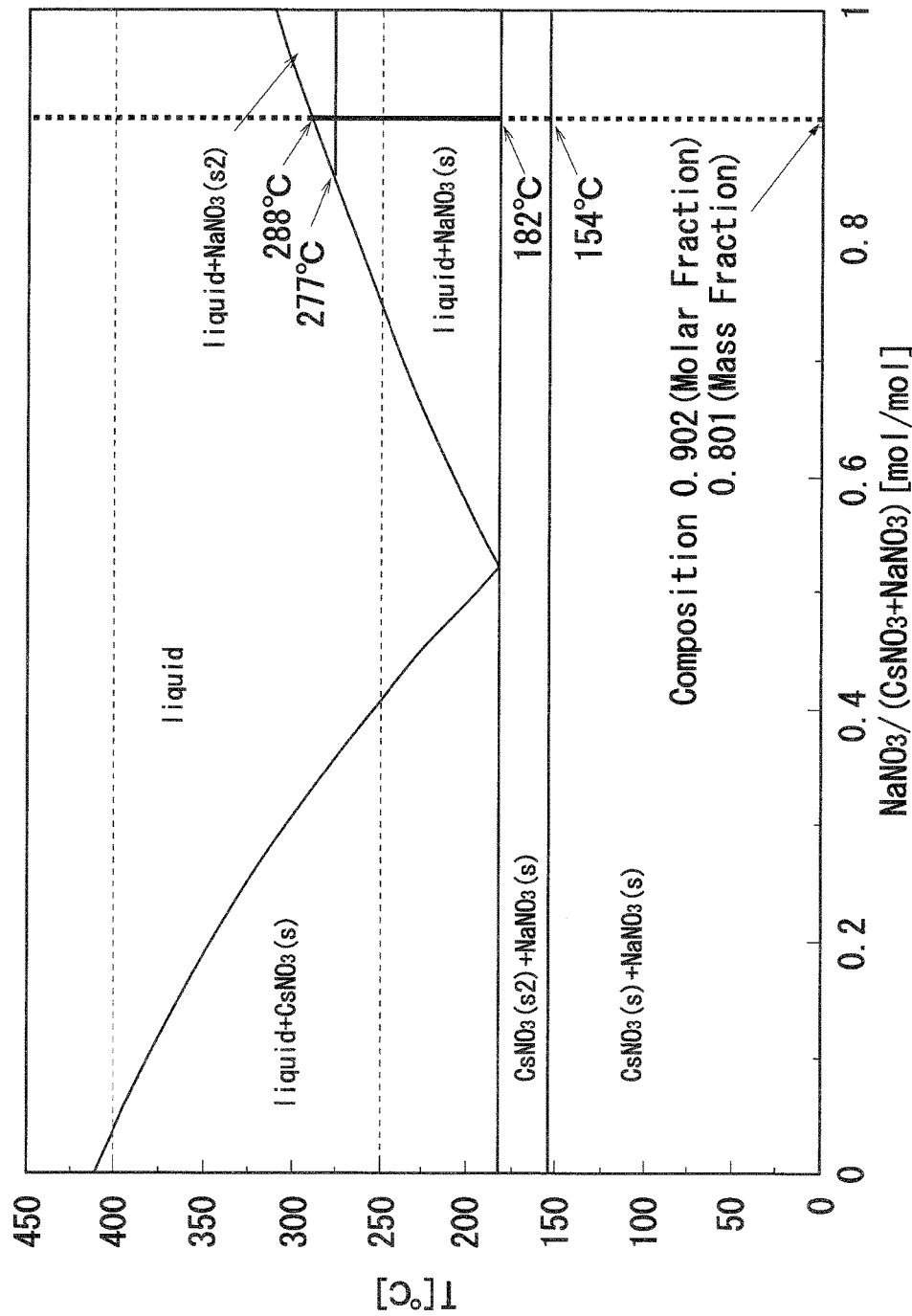

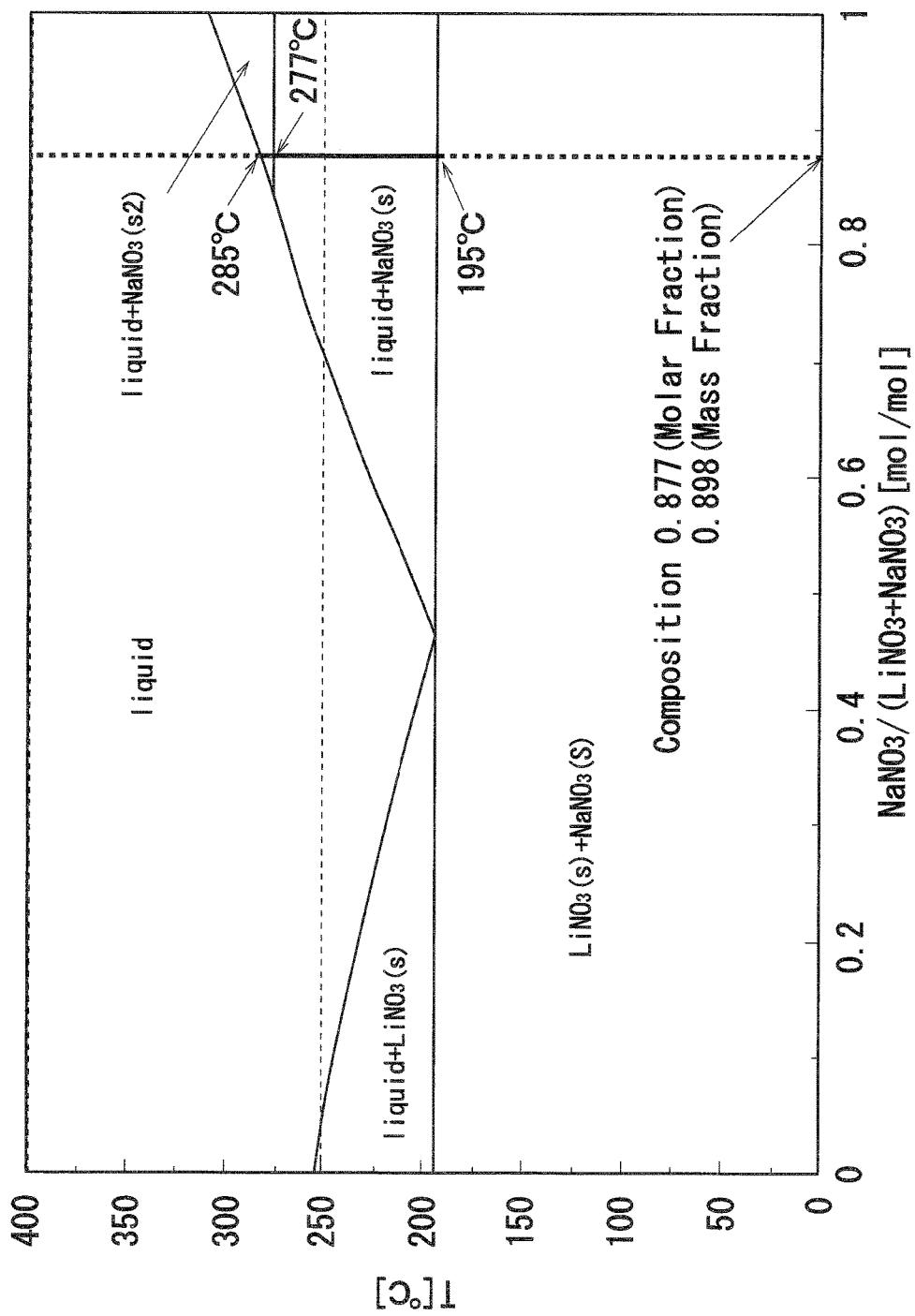

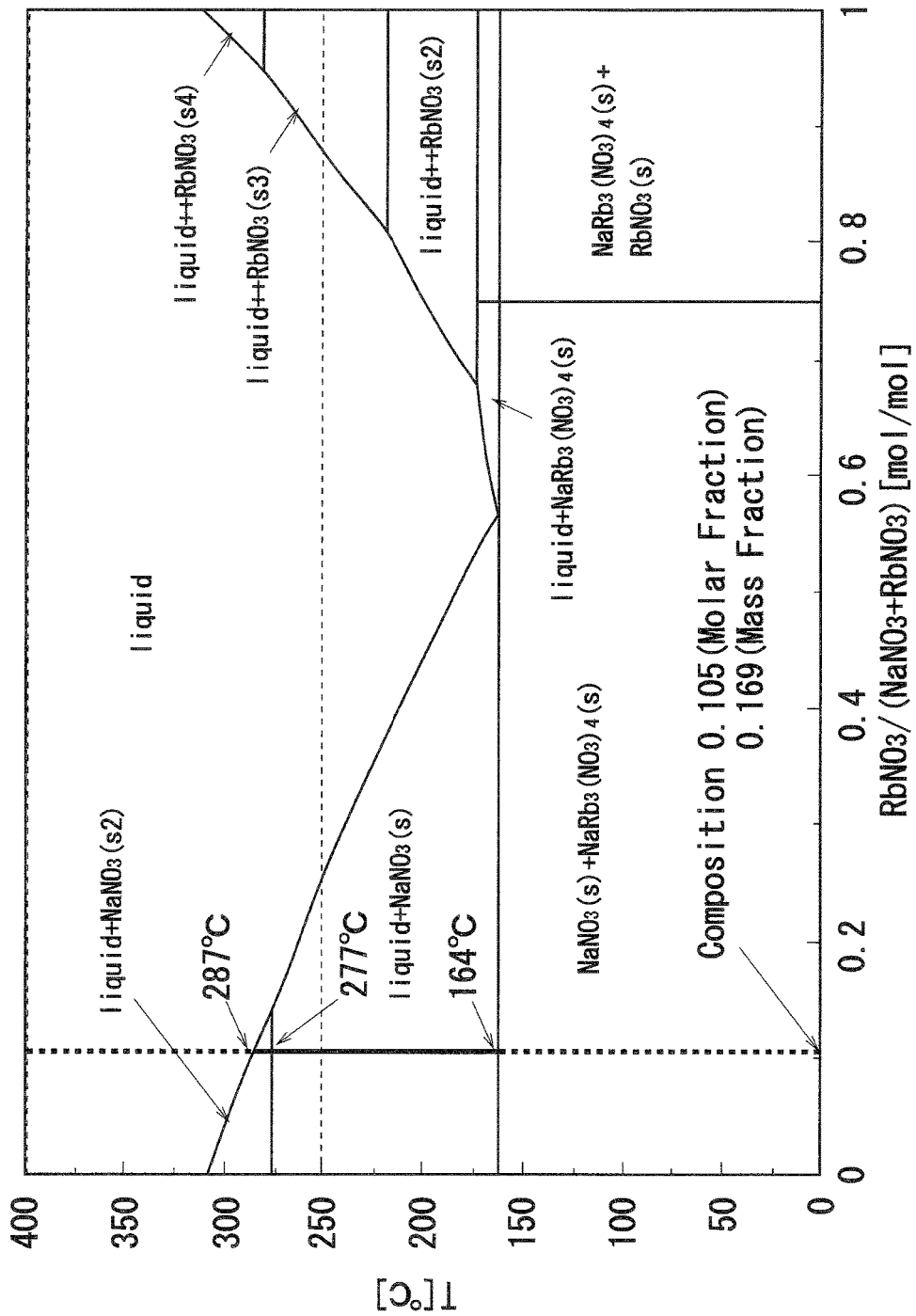

HEAT STORAGE SYSTEM

CROSS REFERENCE TO RELATED APPLICATIONS

This application is a divisional of U.S. patent application Ser. No. 14/939,097, filed on Nov. 12, 2015, which is Continuation of International Application No. PCT/JP2014/059294, filed on Mar. 28, 2014 claiming the priority of Japanese Patent Application No. 2013-105262, filed on May 17, 2013, the disclosures of each of which are incorporated herein by reference in their entireties, and priority is claimed to each of the foregoing.

TECHNICAL FIELD

The present disclosure relates to a heat storage system.

BACKGROUND ART

A solar heat power generation system is known that condenses solar light in a heat collection area to collect heat, generates water vapor by the collected heat to drive a steam turbine, and generates power. In the solar heat power generation system, a heat storage system is provided in general in order to supplement the power generation at night or during a period of time in which sufficient solar radiation cannot be obtained, and also to suppress the transitional variance in an output power.

As the heat storage system used for the solar heat power generation system or the like, it is known to use, as a heat storage material, a molten salt in a liquid state, which is so called solar salt (e.g., a mixture of potassium nitrate ($KNO_3$) and sodium nitrate ($NaNO_3$), a mass fraction of sodium nitrate of 0.6), and to store heat by employing sensible heat (for example, see Patent Literature 1).

However, when a quantity (capacity) of heat storage becomes greater, for example, 1TJ, the required heat storage tank becomes too larger in the heat storage system employing the sensible heat so that such too large heat storage tank is no more realistic. To cope with this, in order to keep the realistic dimension of the heat storage system employing the sensible heat, it is desired to have a heat storage system employing latent heat instead.

LISTING OF REFERENCES

Patent Literatures

PATENT LITERATURE 1: Japanese Patent Application Laid-Open Publication (Kokai) No. Hei 5-256591 A
PATENT LITERATURE 2: Japanese Patent Application Laid-Open Publication (Kokai) No. 2004-225964 A
PATENT LITERATURE 3: Japanese Patent Application Laid-Open Publication (Kokai) No. Hei 5-203201 A
PATENT LITERATURE 4: Japanese Patent Application Laid-Open Publication (Kokai) No. Hei 11-44494 A
PATENT LITERATURE 5: Japanese Patent Application Laid-Open Publication (Kokai) No. 2008-175189 A
PATENT LITERATURE 6: Japanese Patent Application Laid-Open Publication (Kokai) No. 2001-4290 A

SUMMARY

However, the conventional heat storage system, which uses the latent heat, has a lower heat conductivity in a solid phase and no liquidity. Thus, it is required to spread a heat transfer tube (pipe) throughout the interior of the heat storage tank, and therefore the whole heat storage tank has to serve as a heat exchanger unit. As a result, particularly in the case that the heat storage tank has a large size, it entails a problem that the manufacturing cost becomes considerably higher.

On the other hand, in the case that the latent heat is employed instead, the heat storage tank is capable of being compact in comparison with the case that the sensible heat is employed. However, even in this case, when the quantity of heat storage becomes approximately 1TJ, then the volume of the heat storage tank becomes in the order of 1,000 $m^3$. Thus, manufacturing cost becomes higher in order to spread the heat transfer tube (pipe) throughout the heat storage tank.

The Patent Literature 4 discloses that, in the heat storage apparatus employing the heat storage material having a higher (greater) specific gravity in the solid phase than in the liquid phase, a heat source is arranged at a lower section in the storage tank, and a flow channel of a heat exchange medium for cooling the heat storage material is arranged at an upper section of the heat source. However, according to the Patent Literature 4, there is a problem that the heat storage material, which is settled out and in the solid phase, adheres to a side wall of the storage tank so that the heat transmission efficiency is deteriorated.

Therefore, an object of the present disclosure is to solve the above mentioned problem and to provide a heat storage system that is capable of being manufactured at lower cost and has higher heat transmission efficiency in the heat storage system employing the latent heat.

The present disclosure has been made in order to achieve the above-described object. A first aspect of the present disclosure provides a heat storage system including: a heat storage material having a higher specific gravity in a solid phase than in a liquid phase; a heat storage tank for containing the heat storage material; a cooling side heat exchanger arranged at an upper section inside the heat storage tank for cooling the heat storage material; a heating side heat exchanger arranged at a lower section inside the heat storage tank for heating the heat storage material; and a side surface heater for heating a side wall of the heat storage tank.

BRIEF DESCRIPTION OF THE DRAWINGS

FIG. 1b is a state transition diagram of a mixture of $KNO_3$ and $NaNO_3$, which is used as the heat storage material according to the present disclosure;
FIG. 2 is a state transition diagram of a mixture of $CsNO_3$ and $NaNO_3$, which is used as the heat storage material according to the present disclosure;
FIG. 3 is a state transition diagram of a mixture of $LiNO_3$ and $NaNO_3$, which is used as the heat storage material according to the present disclosure;
FIG. 4 is a state transition diagram of a mixture of $NaNO_3$ and $RbNO_3$, which is used as the heat storage material according to the present disclosure.

FIG. 12a is a perspective view; and FIGS. 12b and 12c are sectional views;

FIG. 14a is a schematic view thereof; and FIG. 14b is a top plan view as seen from above.

DETAILED DESCRIPTION

Hereinafter, embodiments of the present disclosure will be described in detail with reference to the accompanying drawings.

Figure 1A:
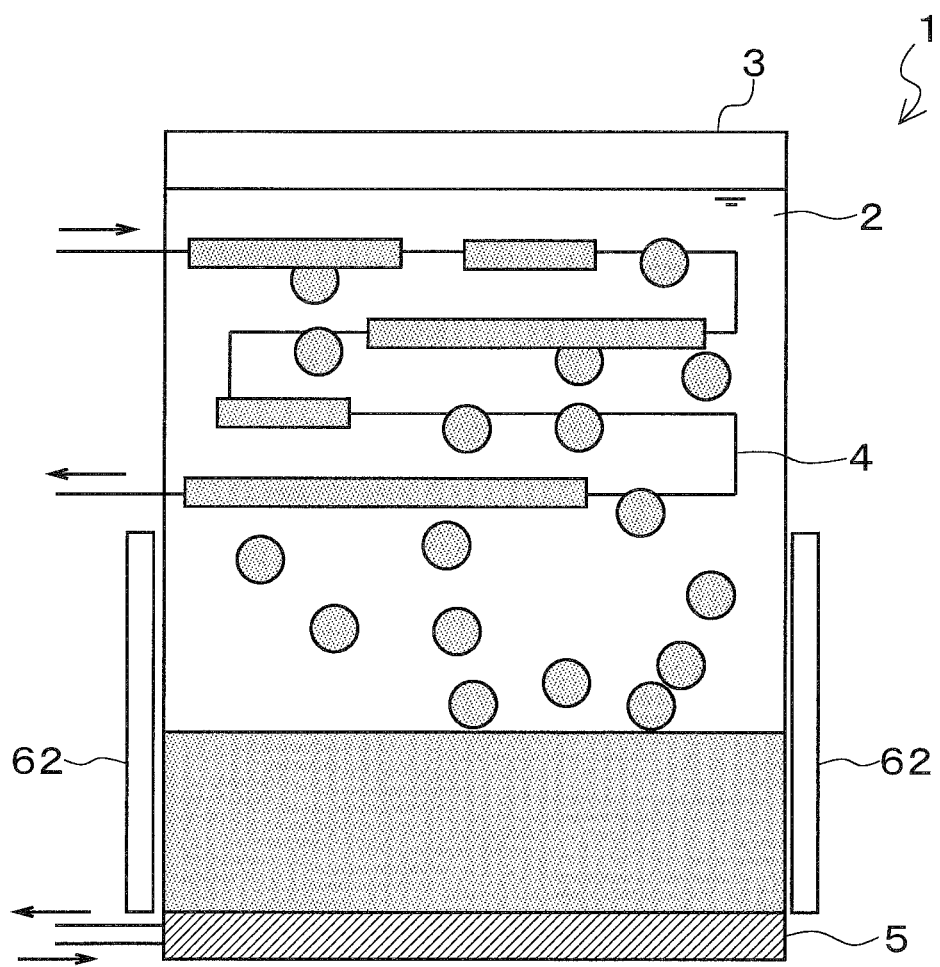
FIG. 1a is a schematic view of a heat storage system according to one embodiment of the present disclosure.

FIG. 1a is a schematic view of a heat storage system according to the present embodiment. FIG. 1b is a state transition diagram of a mixture of potassium nitrate ($KNO_3$) and sodium nitrate ($NaNO_3$), which is used as a heat storage material according to the present embodiment.

As shown in FIG. 1a, the heat storage system 1 comprises a heat storage tank 3 for containing a heat storage material 2, and two heat exchangers 4, 5 arranged inside the heat storage tank 3. It should be noted that, in FIG. 1a, the heat storage material 2 in a solid phase is shown in hatching.

One of the two heat exchangers 4, 5 is a cooling side heat exchanger 4 arranged at an upper section inside the heat storage tank 3 for cooling the heat storage material 2, and the other one is a heating side heat exchanger 5 arranged at a lower section inside the heat storage tank 3 for heating the heat storage material 2.

The cooling side heat exchanger 4, to which a first heat medium at low temperature serving as a heat medium for cooling is supplied, cools the heat storage material 2 by exchanging heat between the first heat medium and the heat storage material 2, and outputs the first heat medium, which becomes at high temperature by heat exchange, to a heat load or the like. The cooling side heat exchanger 4 is formed by a heat transfer tube for flowing the first heat medium, and arranged only at the upper section inside the heat storage tank 3. The heat storage material 2 is contained inside the heat storage tank 3 such that the whole cooling side heat exchanger 4 is soaked (filled) with the heat storage material 2.

In order to suppress the adhesion of the heat storage material 2, which is solidified and become a solid phase, preferably, a cooling surface of the cooling side heat exchanger 4 that contacts the heat storage material 2 is made of glass.

As the first heat medium used for the cooling side heat exchanger 4, a heat medium in a liquid phase, or alternatively steam, can be used. When steam is used, the temperature of steam can be easily regulated by regulating the pressure thereof. Thus, when the steam is used as the first heat medium, it is easier to regulate the temperature of the cooling side heat exchanger 4. It should be noted that, when the heat medium in the liquid phase is used for the first heat medium, the first heat medium does not become at high pressure that much. For this reason, it is not necessary to have the cooling side heat exchanger 4 with a structure durable for the high pressure so that advantageously, the manufacturing cost can be reduced. Moreover, the heat storage material 2 can be cooled by evaporating water in the cooling side heat exchanger 4 into steam. With this configuration, the heat storage material 2 can be cooled in an effective manner.

The heating side heat exchanger 5, to which the second heat medium at high temperature serving as a heat medium for heating is supplied, heats the heat storage material 2 for heat storage, by exchanging heat between the second heat medium and the heat storage material 2. The heating side heat exchanger 5 is formed by a hot plate that is a plat like heat exchanger inside which a flow channel for flowing the second heat medium is arranged, and arranged at a bottom surface of the heat storage tank 3.

Figure 12A:
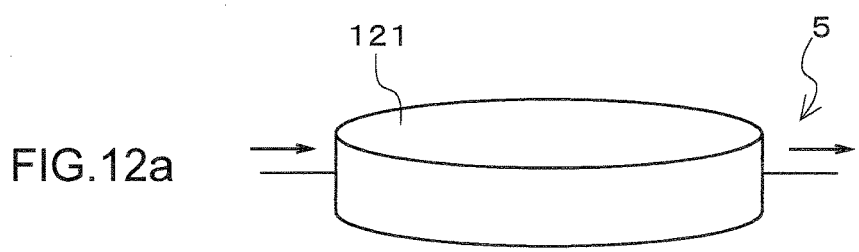
FIGS. 12a to 12c are views of one example of a hot plate used as a heating side heat exchanger according to the present disclosure.
Figures 12B, 12C:
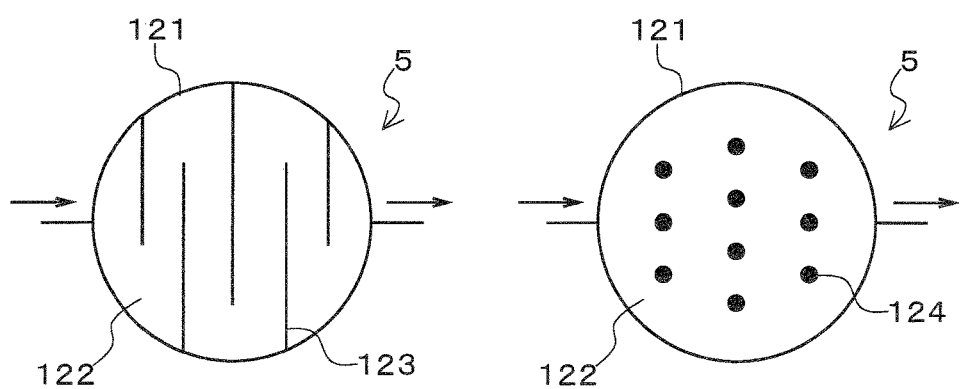

As shown in FIGS. 12a-12c, the hot plate used for the heating side heat exchanger 5 may employ a disk shaped member 121 having a hollow section 122 serving as a flow channel for flowing the second heat medium. As such, the hot plate may have a configuration such that the hollow section 122 is provided with a partition plate 123 or a pillar (strut) 124.

Although the detail will be described in the followings, the present embodiment is configured such that the heat storage material 2 in a solid phase, which is settled down below, is heated by the heating side heat exchanger 5. For this reason, as the temperature distribution on a surface of the hot plate serving as the heating side heat exchanger 5 becomes wider (larger), the heat storage material 2 in the solid phase becomes a state such that the heat storage material 2 partially melts while it partially does not melts. Thus, there is a risk that a gap is generated between the heat storage material 2 in the solid phase and the hot plate so as to deteriorate the heat transmission efficiency. To cope with this, according to the present embodiment, the hollow section 122 is provided with the partition plate 123 or the pillar 124 so that the second heat medium spreads throughout the hollow section 122 to diminish the temperature distribution on the surface. In other words, the partition plate 123 or the pillar 124 combines one role to suppress the deformation and the breakage when the heat storage material 2 in the solid phase which is settled down is pressed onto them, with the other role to diminish the temperature distribution on the surface by spreading the second heat medium throughout the hollow section 122.

It should be noted that a possible configuration of the hot plate is not limited to those described above, and other configuration may be used in which, for example, a plate-like member is welded on an upper surface of a heat transfer tube which is piped such that the heat transfer tube is folded back on an horizontal plane. As a sectional shape of the heat transfer tube is a circular shape, the heat transfer tube is hardly to deform. Therefore, the heat transfer tube is capable to suppressing the occurrence of the deformation or the breakage when the heat storage material 2 in the solid phase, which is settled out, is pressed onto it. Alternatively, it is also possible to have a configuration in which only the heat transfer tube is arranged, in other words, to omit the plate-like member. However, in this case, the deformation or the breakage of the heat transfer tube is likely to occur, as the load concentrates only on a certain part of the heat transfer tube when the settled heat storage material 2 in the solid phase is pressed onto the heat transfer tube.

As the second heat medium used for the heating side heat exchanger 5, not only the heat medium in a liquid phase but also steam can be used. The temperature of the steam can be easily regulated by regulating the pressure thereof. Thus, when the steam is used as the second heating medium, the temperature of the heating side heat exchanger 5 can be easily regulated. It should be noted that when the heating medium in the liquid phase is used for the second heating medium, then the second heating medium does not become at the high pressure that much. For this reason, the heating side heat exchanger 5 is not required to have a structure durable against the high pressure, so that it is possible to reduce the manufacturing cost. Moreover, it is also possible to have another configuration in which high temperature steam is condensed inside the heating side heat exchanger 5 to heat the heat storage material 2. With employing this configuration, the heat storage material 2 can be heated in an efficient manner.

Although not shown in the figures, a stirring unit for stirring the heat storage material 2 may be provided inside the heat storage tank 3. Moreover, when the heat storage material 2 is cooled, the heat storage material 2 in the solid phase is likely to adhere to the locally generated low temperature portion relatively in a firm manner. To cope with this, a heat insulation unit or a heating unit may be provided at the locally generated low temperature portion (for example, a gas-liquid interface of the cooling surface, or an edge section of the supply side of the first heat medium, or the like). It should be noted that it is preferable not to allow the cooling side heat exchanger 4 to expose from the heat storage material 2, in order to avoid the generation of the locally generated low temperature portion.

According to the present embodiment, it is assumed that the heat storage system is to be applied to the high temperature system such as a solar heat power generation system or the like. For this reason, the minimum temperature of heat storage $T_{min}$ is equal to or greater than 150 degrees Celsius, and preferably equal to or greater than 200 degrees Celsius. Here, as one example, the case where the maximum temperature of heat storage $T_{max}$ is 400 degrees Celsius, and the minimum temperature of heat storage $T_{min}$ is 250 degrees Celsius will be described below.

In the heat storage system 1, the heat storage material that has a higher specific gravity in a solid phase than in a liquid state. With employing this configuration, the heat storage material 2 is cooled by the cooling side heat exchanger 4 arranged above, settled out to become its solid state, and deposited on a lower section of the heat storage tank 3. As a result, it is possible to suppress the deterioration of the heat transfer efficiency due to the heat storage material 2 in the solid phase.

Meanwhile, when the heat storage material 2 in the solid phase is adhered to the surface of the cooling side heat exchanger 4, as the heat storage material 2 in the solid phase does not settled out, it may cause the deterioration of the heat transfer efficiency. To cope with this, it is preferable to use the heat storage material 2 that hardly adheres to the surface of the cooling side heat exchanger 4.

For this reason, the heat storage system 1 according to the present embodiment uses, as the heat storage material 2, a two component mixed salt with an amorphous composition that becomes a solid-liquid coexisting state at the minimum temperature of the heat storage $T_{min}$.

Here, the case will be described where the two component mixed salt is used, as the heat storage material 2, in which potassium nitrate ($KNO_3$) and sodium nitrate ($NaNO_3$) are mixed with an amorphous composition.

As shown in FIG. 1b, the mixture of potassium nitrate and sodium nitrate become eutectic with a composition in which the molar (mol) fraction of sodium nitrate is 0.49. Accordingly, the composition is to be determined other than the eutectic composition and such that it becomes the solid-liquid coexisting stated at 250 degrees Celsius of the minimum temperature of the heat storage $T_{min}$.

According to the present embodiment, those used for the heat storage material 2 are the composition shown in a bold and dashed line in FIG. 1b, in other words, the composition in which the molar fraction of sodium nitrate is 0.786 (0.755 of mass fraction).

In this case, as the heat storage material 2 is gradually cooled from 400 degrees Celsius of the maximum temperature of the heat storage $T_{max}$, the solid phase occurs at 274 degrees Celsius. With further being cooled, the rate of the solid phase gradually increases, and the heat storage material 2 then reaches down to 250 degrees Celsius of the minimum temperature of the heat storage $T_{min}$. At this moment, the solid phase occurs at a cooling surface of which temperature is the lowest (the surface of the heat transfer tube serving as the cooling side heat exchanger 4), and the solid phase grows along the cooling surface. However, as the solid phase does not adhere to the cooling surface, the solid phase exfoliates due to the flow of the heat storage material 2 or the like. It should be noted that when the heat storage material 2 is further cooled below the 250 degrees Celsius of the minimum temperature of the heat storage $T_{min}$, then the heat storage material 2 completely becomes the solid phase at 234 degrees Celsius. In other words, the heat storage material 2 becomes the solid-liquid coexisting state in the temperature range shown in the bold and solid line in FIG. 1b.

The solid phase rate of the heat storage material 2 can be controlled with the temperature. When the temperature width of the solid-liquid coexisting state is too narrow, then it is difficult to control the solid phase rate to the desired value. It is therefore preferable to determine the composition such that the temperature width of the solid-liquid coexisting state is equal to or greater than 1 degree Celsius. It should be noted that when the heat storage material, as disclosed in the Patent Literature 1, having the solid-liquid coexisting state of which substance are different each other between its solid state and its liquid state, it is difficult to control the solid phase rate with the temperature.

As described above, when the two component mixed salt with the amorphous composition is used, then the heat storage material 2, which is solidified and becomes the solid phase, does not firmly adhere to the cooling surface (the surface of the heat transfer tube serving as the cooling side heat exchanger 4), therefore easily exfoliates.

It is assumed that, as the solid phase rate in the vicinity of the cooling surface becomes larger locally when starting to solidify, the solidification progresses while a molten salt in the liquid phase with relatively low melting point penetrates between the cooling surface and the solid phase. Therefore, the solid-liquid coexisting state of the amorphous molten salt exists with the certain temperature width. As a result, with controlling such that the solid phase gradually increases from the liquid phase state (in other words, the temperature gradually decreases), it is possible to suppress the heat storage material 2, which becomes the solid phase, from adhering to the cooling surface.

The heat storage material 2 in the solid phase, which exfoliates due the flow or stirring or the like of the heat storage material 2, has a higher specific gravity than the heat storage material 2 in the liquid phase. Thus, the heat storage material 2 in the solid phase settles out at the lower section of the heat storage tank 3. Accordingly, with providing the cooling side heat exchanger 4 at the upper section of the heat storage tank 3, it is possible to cool the heat storage material 2 in the liquid phase in an efficient manner. Moreover, with providing the heating side heat exchanger 5 at the bottom surface of the heat storage tank 3, as the heat storage material 2 in the solid phase is pressed onto the heating side heat exchanger 5 by its own weight, it is possible to heat the heat storage material 2 in the solid phase in an efficient manner.

The present embodiment uses the mixture of potassium nitrate and the sodium nitrate as the heat storage material 2. However, the possible material is not limited to the above described one. It is possible to use any material as the heat storage material 2, as long as it is the two component mixed salt with the amorphous composition in which it becomes the solid-liquid coexisting state at the minimum temperature of the heat storage $T_{min}$.

For example, when $T_{max}$=400 degrees Celsius and $T_{min}$=250 degrees Celsius, then it is possible to use, as the heat storage material 2, the mixture of $CsNO_3$ and $NaNO_3$, the mixture of $LiNO_3$ and $NaNO_3$, or the mixture of $NaNO_3$ and $RbNO_3$. As such, when $T_{min}$=280 degrees Celsius, it is possible to use the mixture of LiBr and $NaNO_3$ as the heat storage material 2. FIGS. 2 to 5 show the equilibrium state diagrams, respectively.

Figure 5:
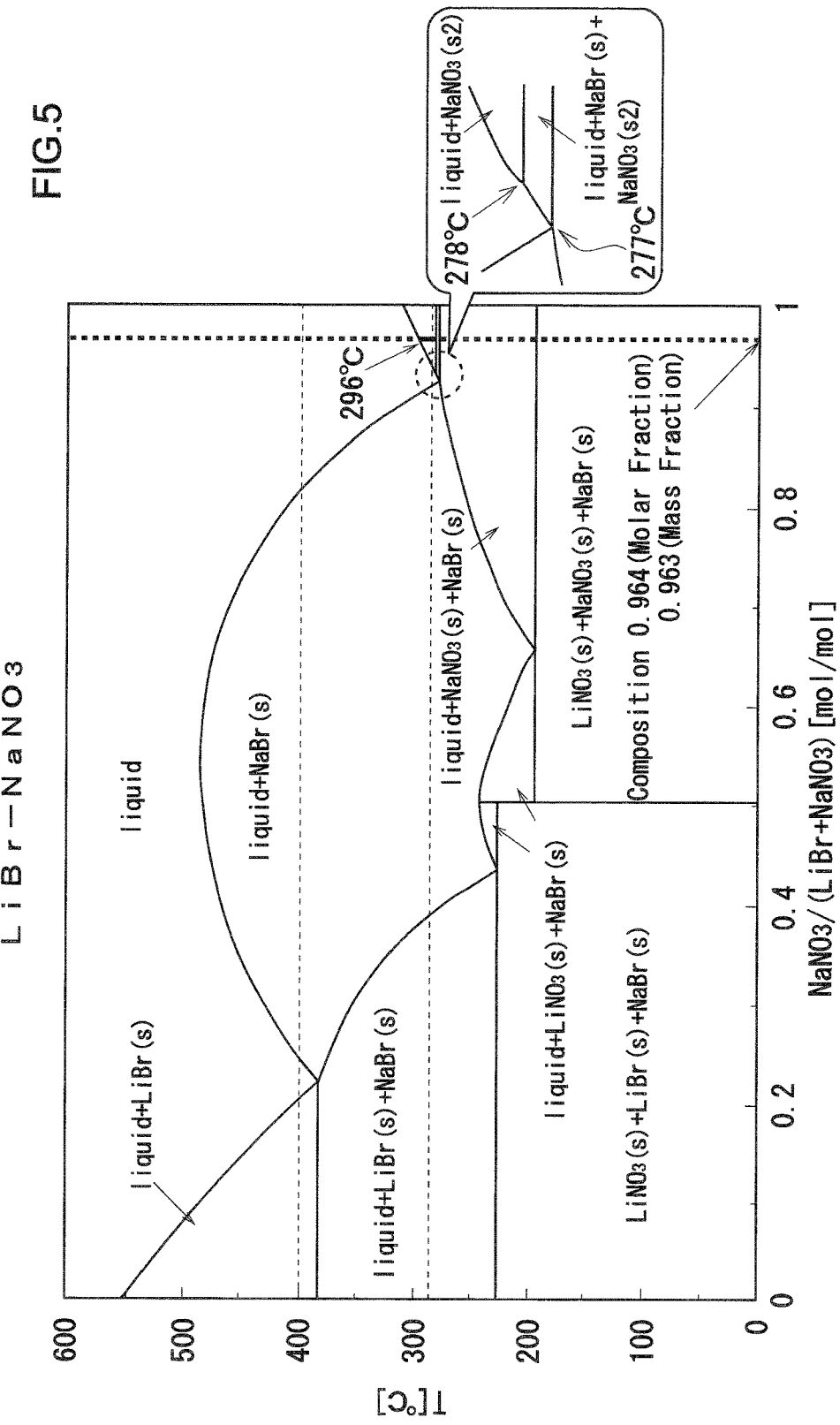
FIG. 5 is a state transition diagram of a mixture of LiBr and $NaNO_3$, which is used as the heat storage material according to the present disclosure.

As shown in FIG. 2, when the mixture of $CsNO_3$ and $NaNO_3$ is used as the heat storage material 2, by setting the molar fraction of $NaNO_3$ to 0.902 (the mass fraction of 0.801), it is possible to obtain the solid-liquid coexisting state at $T_{min}$=250 degrees Celsius. Likewise, when the mixture of $LiNO_3$ and $NaNO_3$ is used as the heat storage material 2 as shown in FIG. 3, by setting the molar fraction of $NaNO_3$ to 0.877 (the mass fraction of 0.898), it is possible to obtain the solid-liquid coexisting state at $T_{min}$=250 degrees Celsius. Yet likewise, when the mixture of $NaNO_3$ and $RbNO_3$ is used as the heat storage material 2 as shown in FIG. 4, by setting the molar fraction of $RbNO_3$ to 0.105 (the mass fraction of 0.169), it is possible to obtain the solid-liquid coexisting state at $T_{min}$=250 degrees Celsius. Yet likewise, when the mixture of LiBr and $NaNO_3$ is used as the heat storage material 2 as shown in FIG. 5, by setting the molar fraction of $NaNO_3$ to 0.964 (the mass fraction of 0.963), it is possible to obtain the solid-liquid coexisting state at $T_{min}$=280 degrees Celsius. In any case, in FIGS. 2 to 5, similarly to FIG. 1*b*, the temperature range of the solid-liquid coexisting state is shown in the bold and solid line.

Moreover, the heat storage system 1 is further provided with a wall surface heater 62 for heating a side wall of the heat storage tank 3. The wall surface heater 62 is controlled such that, for example, the wall surface heater 62 is turned on when the heating side heat exchanger 5 heats the heat storage material 2 (in other words, when storing heat).

An electrical heater may be used as the wall surface heater 62. It should be noted that the wall surface heater 62 is not limited to the electrical heater. For example, the wall surface heater 62 may be configured by arranging a pipe (piping) for flowing the steam at high temperature on the side wall of the heat storage tank 3. As it is possible to easily regulate the temperature of the steam by regulating the pressure thereof, by using the steam for the heat source of the wall surface heater 62, it is possible to easily regulate the temperature of the wall surface heater 62. Moreover, it is possible to configure the wall surface heater 62 integrally with the heating side heat exchanger 5.

Figure 6A:
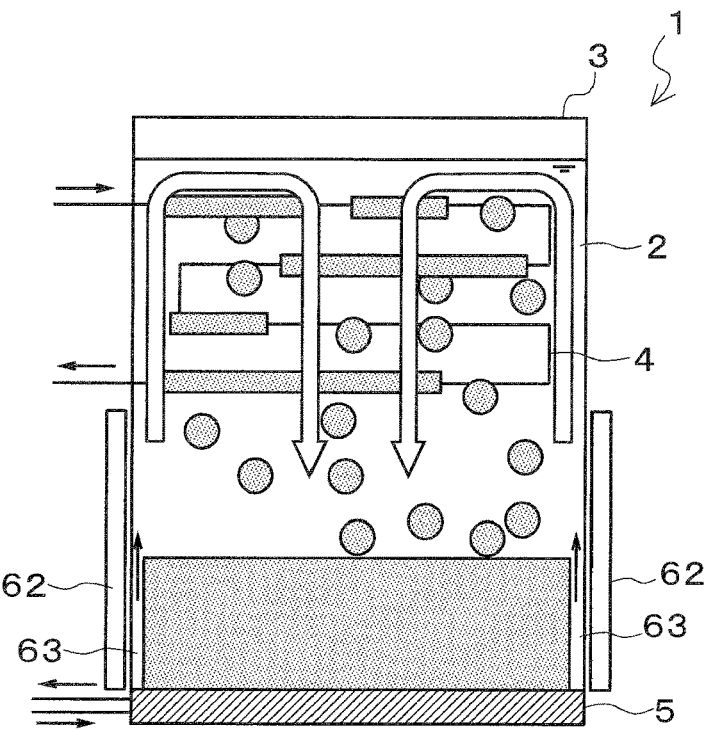
FIGS. 6a to 6c are schematic views of a heat storage system according to one modification of the present disclosure.

Although FIG. 6*a* shows the configuration in which the wall surface heater 62 is arranged outside the heat storage tank 3, alternatively, the wall surface heater 62 may be arranged inside the heat storage tank 3 (for example, along an inner wall of the heat storage tank 3).

With employing the wall surface heater 62, it is possible to melt the heat storage material 2 in the solid phase in the vicinity of the side wall, and to resolve the adhesion of the heat storage material 2 in the solid phase to the side wall. As a result, the heat storage material 2 in the solid phase can freely move in a vertical direction. Thus, it is possible to press the heat storage material 2 in the solid phase against (onto) the heating side heat exchanger 5 (the hot plate) by its own weight, and to allow a layer of the heat storage material 2 in the liquid phase to become thinner which is formed between the heating side heat exchanger 5 and the heat storage material 2 in the solid phase so that the heat transfer can be facilitated.

Also, the solid phase in the vicinity of the wall surface inside the heat storage tank 3 is melted, and a fluid channel 63 is formed for flowing the heat storage material 2 in the liquid phase. Thus, the heat storage material 2 in the liquid phase, which is melted due to heating by the heating side heat exchanger 5, escapes to the upper section (upwardly) thorough the fluid channel 63. Accordingly, it is possible to suppress an increase of pressure at the lower section of the heat storage tank 3, and also to suppress a defect such as the breakage or the like of the heat storage tank 3. In the heat storage system 61, the flow of the heat storage material 2 in the liquid phase inside the heat storage tank 3 becomes, as shown in FIG. 6*a*, upward (ascending) flow in the peripheral section of the heat storage tank 3 and downward (descending) flow in the center section of the heat storage tank 3.

Figure 6B:
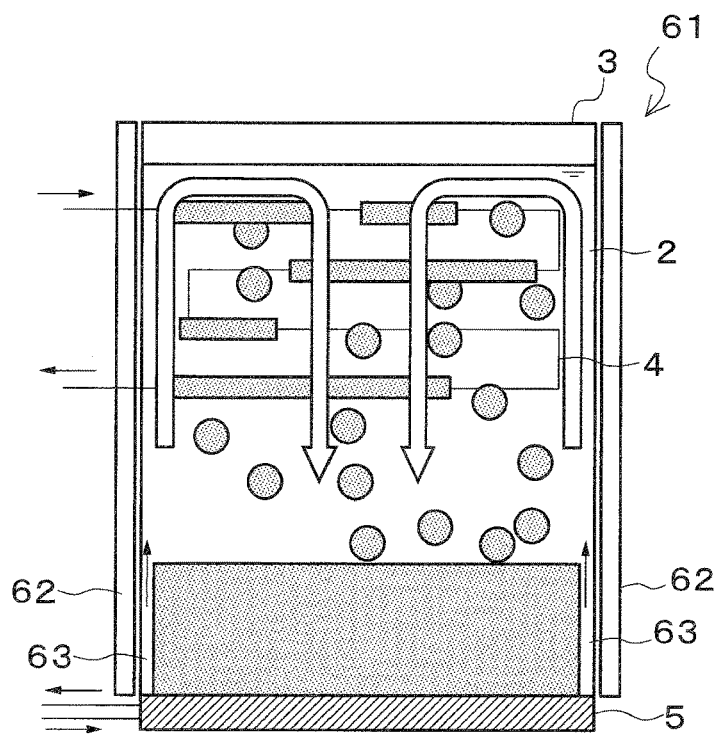

Although the heat storage system 1 is provided with the wall surface heater 62 only at the lower section of the heat storage tank 3, the possible arrangement is not limited to the above described one. For example, as shown in the heat storage system 61 in FIG. 6*b*, the wall surface heater 62 may be arranged on whole side wall of the heat storage tank 3. With employing this configuration, even if the whole heat storage material 2 becomes in the solid phase due to some sort of trouble, it is possible to heat the heat storage material 2 by the wall surface heater 62 to melt the heat storage material 2 in the solid phase.

Moreover, although in the heat storage system 1, the fluid channel 63 is formed in the peripheral section of the heat storage tank 3 (in the vicinity of the side wall), alternatively, it is of course possible to form the fluid channel 63 in the part other than the peripheral section of the heat storage tank 3.

Figure 6C:
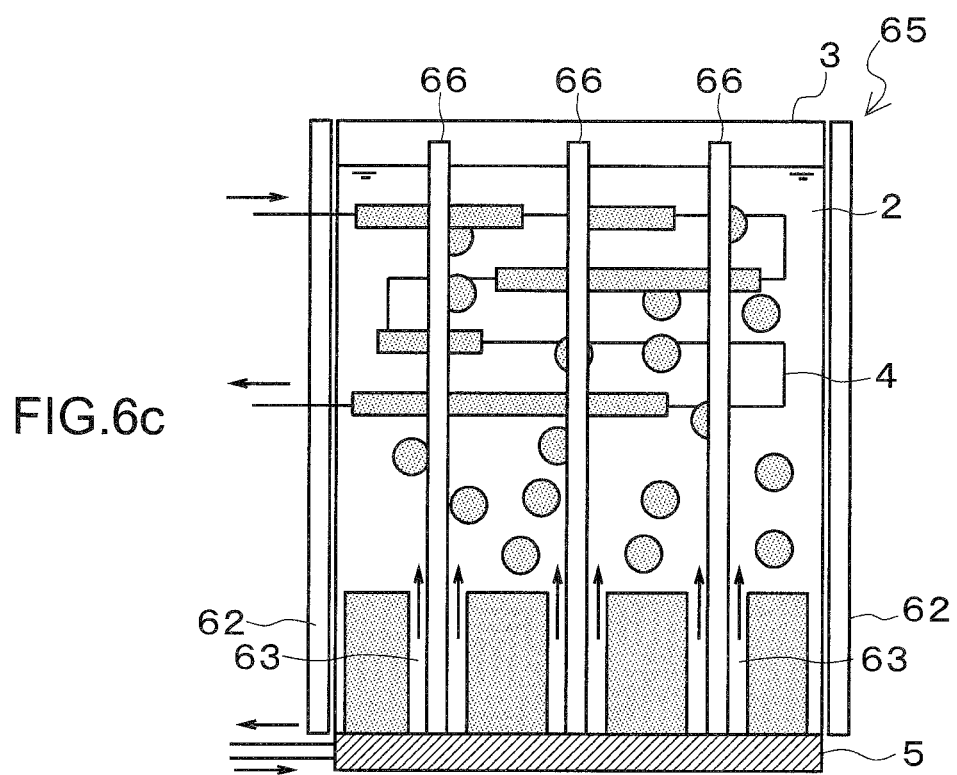

For example, as in the heat storage system 65 shown in FIG. 6*c*, an auxiliary heater 66 may be provided for forming the fluid channel 63 which allows the heat storage material 2, which becomes the solid phase from the liquid phase due to the heating by the heating side heat exchanger 5, to escape upwardly.

Furthermore, in FIG. 6*c*, a rod like auxiliary heater 66 is provided such that the auxiliary heater 66 extends from the upper section to the lower section of the heat storage tank 3.

However, alternatively, the auxiliary heater 66 may be provided at least at the lower section on which the heat storage material 2 in the solid phase is deposited, and the shape thereof is not limited the above described rod like shape. Moreover, although not shown, as a matter of course, it is possible to employ both the wall surface heater 62 and the auxiliary heater 66. The flow of the heat storage material 2 in the liquid phase inside the heat storage tank 3 may be, for example, downward (descending) flow in the peripheral section of the heat storage tank 3, and upward (ascending) flow in the center section of the heat storage tank 3.

As described above, the heat storage system 1 according to the present embodiment comprises the heat storage material 2 having a higher specific gravity in the solid phase than in the liquid phase, the heat storage tank 3 for containing the heat storage material 2, the cooling side heat exchanger 4 arranged at the upper section inside the heat storage tank 3 for cooling the heat storage material 2, the heating side heat exchanger 5 arranged at the lower section inside the heat storage tank 3 for heating the heat storage material 2, and the wall surface heater 62 for heating the side wall of the heat storage tank 3.

With employing the above configuration, the heat storage material 2, which is cooled by the upper cooling side heat exchanger 4 and then solidified, settles out. As a result, it is possible to suppress, by the heat storage material 2 in the solid phase, the degradation in the heat transfer between the cooling side heat exchanger 4 and the heat storage material 2 in the liquid phase. Also, it is possible to heat the heat storage material 2, which has settled out and deposited at the lower section by the lower heating side heat exchanger 5 so as to heat the heat storage material 2 in the solid phase in an efficient manner. Furthermore, as the wall surface heater 62 is provided, it is possible to suppress the adhesion of the heat storage material 2 to the side wall of the heat storage tank 3. Thus, with pressing the heat storage material 2 in the solid phase onto (against) the heating side heat exchanger 5 (hot plate) by its own weight, it is possible to facilitate the heat transfer.

In other words, according to the present embodiment, it is possible to transfer the heat with heat exchangers 4 and 5 without requiring the whole heat storage tank 3 to be a heat exchanging unit, so that the heat storage system 1 with lower cost and higher heat transfer efficiency can be achieved.

Also, the present embodiment uses, as the heat storage material 2, two component mixed salt with the amorphous composition that becomes the solid-liquid coexisting status at the minimum temperature of the heat storage $T_{min}$.

With employing this configuration, as the heat storage material 2, which is solidified and becomes the solid phase, easily exfoliate without firmly adhering to the cooling surface, it is possible to further suppress the degradation in the heat transfer due to the heat storage material 2 in the solid phase.

In the heat storage system 1 of which the minimum temperature of the heat storage $T_{min}$ is equal to or greater than 150 degrees Celsius, conventionally, the heat storage material 2 that can be used in the solid-liquid coexisting state and also can suppress the adhesion of the solid phase to the cooling surface has been not found. On the other hand, the present disclosure is assumed to significantly contribute further development of the heat storage system 1 used in the high temperature area.

Next, another embodiment according to the present disclosure will be described below.

Figure 7A:
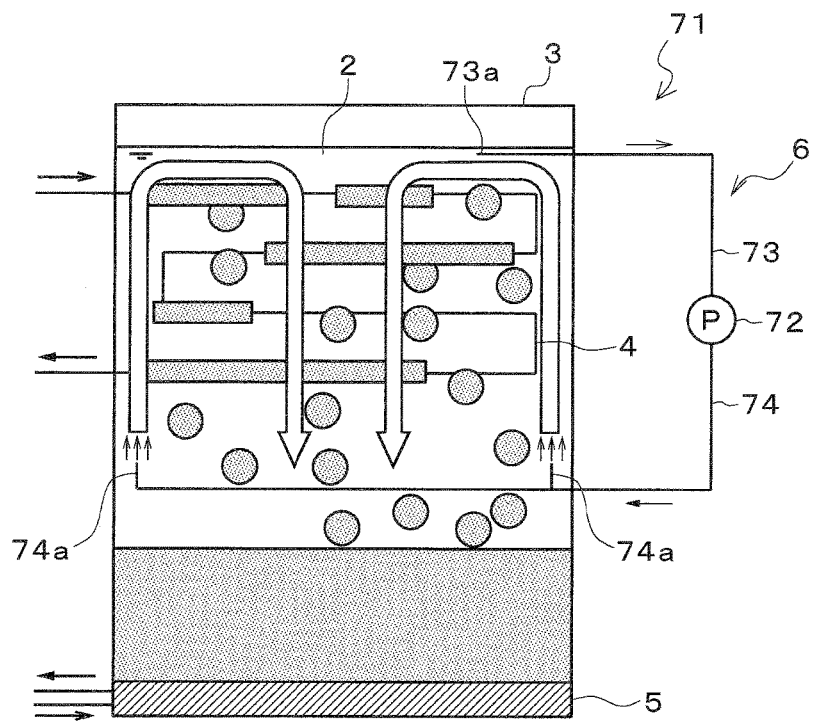
FIGS. 7a and 7b are schematic views of a heat storage system according to another embodiment of the present disclosure.
Figure 7B:
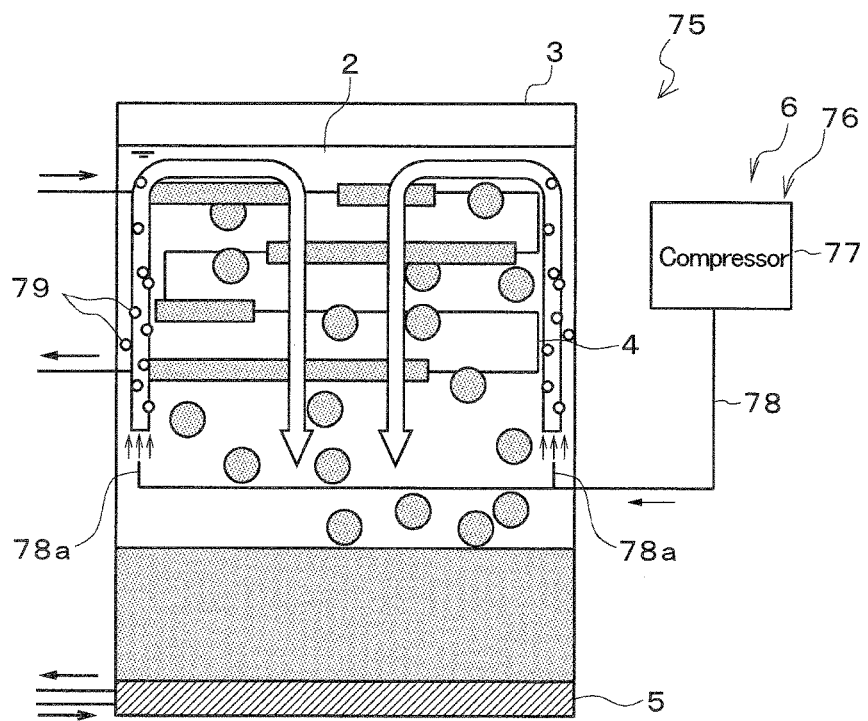

The heat storage system 1 shown in FIG. 7 further comprises a solid phase exfoliation unit 6 for allowing the heat storage material 2, which is cooled by the cooling side heating exchanger 4 and solidified, to exfoliate from the cooling side heat exchanger 4.

In the heat storage system 71, the solid phase exfoliation unit 6 includes a circulating pump 72 for suctioning the heat storage material 2 in the liquid state inside the heat storage tank 3, discharging the suctioned heat storage material 2, and allowing the heat storage material 2 to flow. A suction tube (pipe) 73 is connected to an inlet (intake port) of the circulating pump 72, and a discharge tube (pipe) 74 is connected to an outlet (discharge port) of the circulating pump 72.

At an edge section of the suction tube 73 opposite to the circulating pump 72, an inlet 73a for suctioning the heat storage material 2 is arranged. According to the present embodiment, the inlet 73a is arranged above the cooling side heat exchanger 4.

Likewise, at an edge section of the discharge tube 74 opposite to the circulating pump 72, an outlet 74a for discharging the heat storage material 2. According to the present embodiment, the outlet 74a is arranged below the cooling side heating exchanger 4 and in the peripheral section of the heat storage tank 3 (in the vicinity of the side wall), and configured to expel (jet) the heat storage material 2 upwardly. Also, when the outlet 74a is arranged at the bottom section, then the heat storage material 2, which has once settled out, is lifted again to the upper section. For this reason, the outlet 74a is arranged at the upper section inside the heat storage tank 3. The inlet 73a and the outlet 74a are required to be arranged at least above the position at which the heat storage material 2 in the solid phase is deposited at the minimum temperature of the heat storage $T_{min}$.

With employing the configuration above, in the heat storage system 71, the flow of the heat storage material 2 in the liquid phase inside the heat storage tank 3 becomes an ascending flow in the peripheral section of the heat storage tank 3, and a descending flow in the center section of the heat storage tank 3. By flowing the heat storage material 2 in the liquid phase with the circulating pump 72, it is possible to allow the heat storage material 2, which becomes the solid phase, to exfoliate from the cooling side heat exchanger 4. As a result, it is possible to increase a contact area between the cooling side heat exchanger 4 and the heat storage material 2 in the liquid phase, so that the heat transfer efficiency can be further improved.

It should be noted that the solid phase exfoliation unit 6 is not limited to the above described configuration. For example, as shown in the heat storage system 75 in FIG. 7b, the solid phase exfoliation unit 6 may include a bubble generation device 76 for generating bubbles 79 below the cooling side heat exchanger 4 inside the heat storage tank 3, and allowing the heat storage material 2, which becomes the solid phase, to exfoliate from the cooling side heat exchanger 4.

The bubble generation device 76 includes a compressor 77 for taking in ambient air and compress the ambient air, and an air conveying tube (pipe) 78 for conveying the air compressed by the compressor 77. An outlet 78a of the air conveying tube 78 is arranged below the cooling side heat exchanger 4 and also in the peripheral section of the heat storage tank 3 (in the vicinity of the side wall), and configured to expel (jet) the bubbles 79 upwardly. The outlet 78a is required to be arranged at least above the position at which the heat storage material 2 in the solid phase is deposited at the minimum temperature of the heat storage $T_{min}$.

As the solid phase exfoliation unit 6 with the circulating pump 72 or the bubble generation device 76 has a relatively small power to exfoliate the solid phase, it is effective in the case that the heat storage material 2 with lower adhesiveness to the cooling surface, such as the above described two component mixed salt with the amorphous composition or the like. When the circulating pump 72 or the bubble generation device 76 is used, it is preferable to strengthen the flow of the heat storage material 2 or the supply of the bubbles intermittently, and to allow the heat storage material 2 in the solid phase to exfoliate from the cooling side heat exchanger 4 in an effective manner.

When the heat storage material 2 with higher adhesiveness to the cooling surface, the solid phase exfoliation unit 6 may be configured such that the heat storage material 2 in the solid phase exfoliates by way of an mechanical means.

Figure 8A:
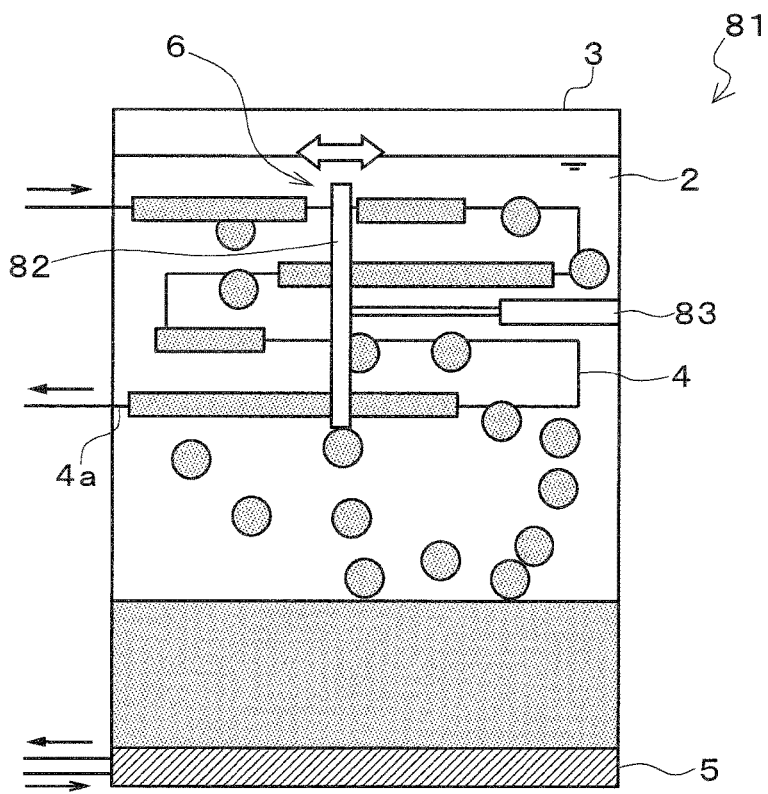
FIG. 8a is a schematic view of a heat storage system according to yet another embodiment of the present disclosure.
Figure 8B:
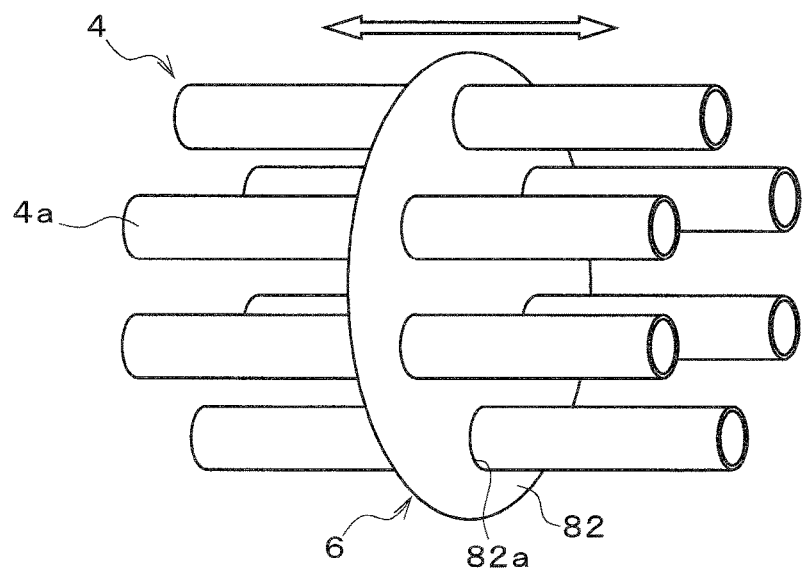
FIG. 8b is an enlarged perspective view of a main part thereof.

In the heat storage system 81 shown in FIGS. 8*a* and 8*b*, the solid phase exfoliation unit 6 includes a slide plate 82 and an actuator 83. In the slide plate 82, a heat transfer tube insertion hole 82*a* is formed for inserting a heat transfer tube 4*a* serving as the cooling side heat exchanger 4. The actuator 83 slidably translates the slide plate 82 in the longitudinal direction of the heat transfer tube 4*a* inserted in the heat transfer tube insertion hole 82*a* and allows the heat storage material 2 in the solid phase adhered to a surface of the heat transfer tube 4*a* to exfoliate.

A material of the slide plate 82 is not particularly limited. However, when it is used in the high temperature region, for example, at 150 degrees Celsius or more, then it is preferable to use metal. According to the present embodiment, the heat transfer tube insertion hole 82*a* has a circular shape. However, the shape is not limited to the above described shape. For example, the heat transfer tube insertion hole 82*a* may be formed such that a plurality of projections or nails protrude towards the heat transfer tube 4*a*.

The actuator 83 is configured such that the slide plate 82 is translated (moved) reciprocally at the predetermined period. As the actuator 83, for example, an air cylinder or an electric motor may be used.

In the heat storage system 81, the heat storage material 2 in the solid phase, which is adhered to the heat transfer tube 4*a*, is periodically stripped by the slide plate 82, and is deposited at the lower section of the heat storage tank 3. As a result, even when the heat storage material 2 which is likely to adhere to the heat transfer tube 4*a* is used, it is possible to constantly expose the surface of the heat transfer tube 4*a* to the heat storage material 2 in the liquid phase, so that the heat transfer capability is capable of being maintained.

Figure 8C:
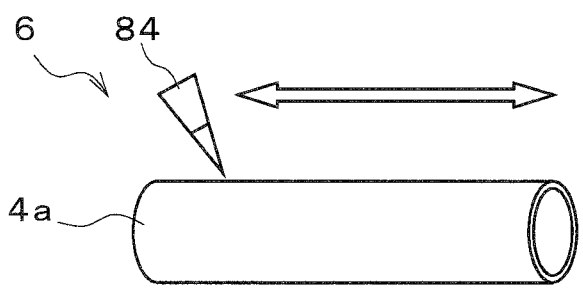
FIGS. 8c and 8d are schematic views of a solid phase exfoliation unit according to one modification to the present disclosure.
Figure 8D:
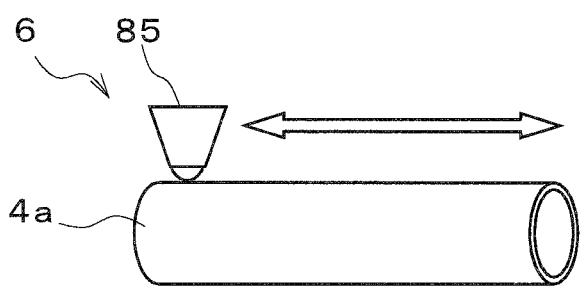

In the FIGS. 8*a* and 8*b*, the case in which the slide plate 82 is used is shown. However, alternatively, as shown in FIG. 8*c*, the solid phase exfoliation unit 6 may be configured such that a slide member 84 with tapered tip (end portion) is provided to reciprocate (translate back and forth) along the surface of the heat transfer tube 4*a*. Yet alternatively, as shown in FIG. 8*d*, the solid phase exfoliation unit 6 may be configured such that a slide member 85 at which a tip (end portion) a bearing is arranged is provided to reciprocate (translate back and forth) along the surface of the heat transfer tube 4*a*. By reciprocating the slide member 84 or 85, as a crack or a nick occurs in the heat storage material 2 adhered to the heat transfer tube 4*a*, the heat storage material 2 in the solid phase is likely to exfoliate by its own weight. Also, a tip (end portion) of the slide member 84 or 85 may be configured to be heated by the heater or the like.

Figure 9:
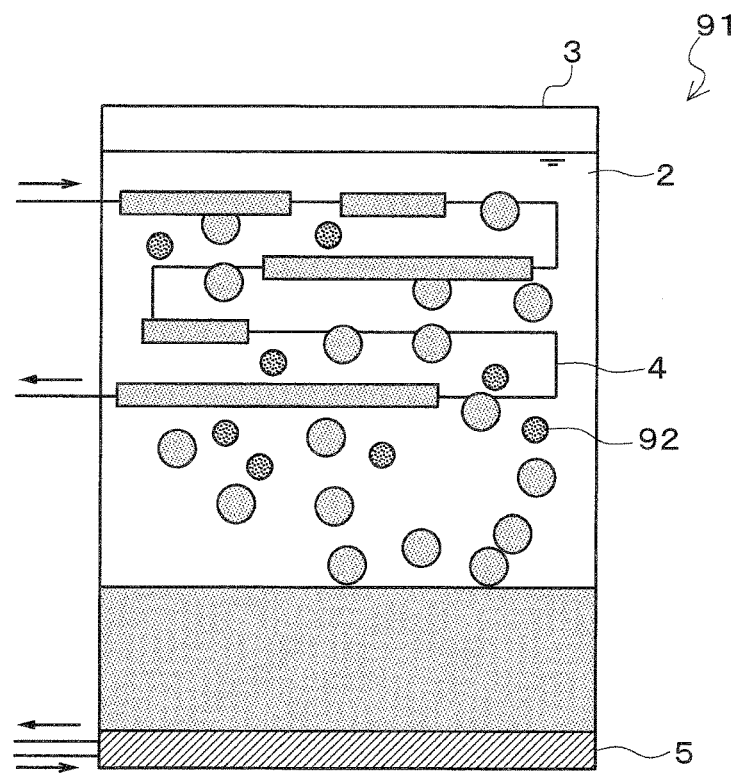
FIG. 9 is a schematic view of a heat storage system according to yet another embodiment of the present disclosure.

Furthermore, as shown in the heat storage system 91 in FIG. 9, as the solid phase exfoliation unit 6, a solid piece 92 may be provided. The solid piece 92 is added to the heat storage material 2, collides with the cooling side heat exchanger 4 due to the flow of the heat storage material 2 in the liquid phase, and allows the heat storage material 2, which becomes the solid phase, to exfoliate from the cooling side heat exchanger 4.

Preferably, the size (maximum length) of the solid piece 92 is equal to or greater than 0.1 mm and equal to or less than 5 mm. This is because, when the size of the solid piece 92 is less than 0.1 mm, then an effect of exfoliating the heat storage material 2 in the solid phase cannot be sufficiently obtained, and on the other hand, when the size of the solid piece 92 is greater than 5 mm, then the heat transfer tube 4*a* is likely to be damaged. Preferably, the solid piece 92 has a similar specific gravity (density) as the heat storage material 2 in the liquid phase, in order to allow the solid piece 92 to drift in the heat storage material 2 in the liquid phase. Although the solid piece 92 is shown in a circular shape (spherical shape) in FIG. 9 in order to simplify the graphic representation, the shape of the solid piece 92 is not limited to the above described one.

Moreover, the heat transfer tube 4*a* of the cooling side heat exchanger 4 may reciprocate in the vertical direction to increase a plane along the vertical direction, so as to allow the heat storage material 2 in the solid phase to be more likely to exfoliate. Also, the heat transfer tube 4*a* may have a shape that is formed in a plate-like shape having a plane along the vertical direction, so as to allow the heat storage material 2 in the solid phase to be more likely to exfoliate.

Yet alternatively, the solid phase exfoliation unit 6 may be configured such that the heat transfer tube 4*a* has a bellows like shape, and the bellows like heat transfer tube 4*a* is expanded and contracted by the actuator to allow the heat storage material 2 in the solid phase to exfoliate.

Yet alternatively, the solid phase exfoliation unit 6 may be configured such that bimetal is arranged for the heat transfer tube 4*a*. By using, for example, the bimetal having a property to deform when it is cooled by the cooling side heat exchanger 4 and to rise from the heat transfer tube 4*a*, it is possible to suppress the adhesion of the heat storage material 2 in the solid phase to the heat transfer tube 4*a*.

Yet alternatively, the solid phase exfoliation unit 6 may include an oscillation device for applying the oscillation to the heat transfer tube 4*a*. With oscillating the heat transfer tube 4*a* by the oscillation device, it is possible to configure the solid phase exfoliation unit 6 for allowing the heat storage material 2 in the solid phase to exfoliate. As the oscillation device, a device for continuously oscillating the heat transfer tube 4*a* may be used. Alternatively, another device for intermittently giving an impact to the heat transfer tube 4*a* to oscillate the heat transfer tube 4*a* may be used.

In the above described heat storage systems 71, 75, 81 and 91, the case in which the solid phase exfoliation unit 6 exfoliates the heat storage material 2 in the solid phase adhered to the cooling side heat exchanger 4. However, the possible configuration is not limited to those described above, and, for example, in the first place, the cooling side heat exchanger 4 and the heat storage material 2 may be configured without directly contacting each other.

Figure 10:
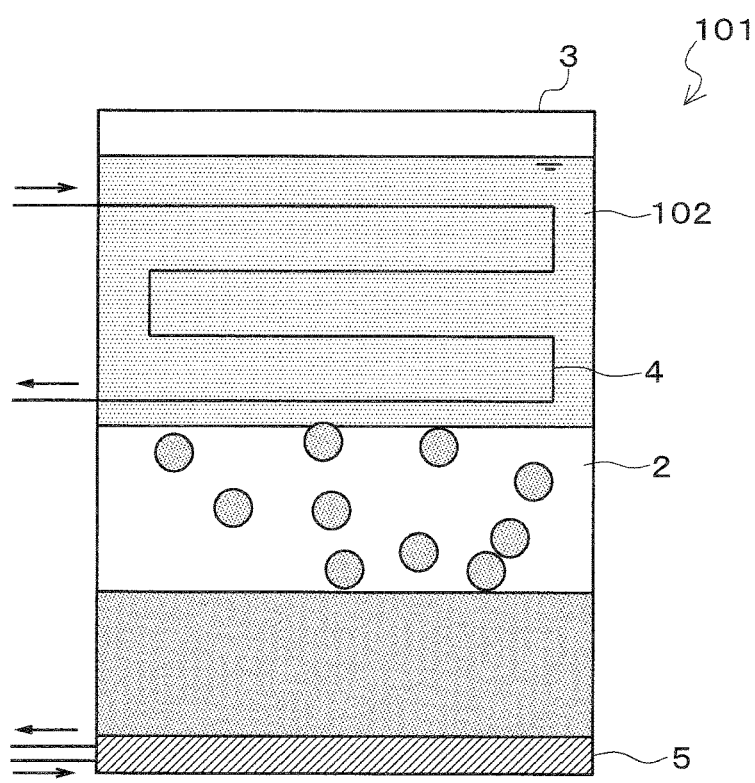
FIG. 10 is a schematic view of a heat storage system according to yet another embodiment of the present disclosure.

More particularly, as shown in the heat storage system 101 in FIG. 10, preferably, an exfoliating material (intermediate heat medium) 102 in the liquid phase that has a smaller specific gravity than the heat storage material 2 in the liquid phase and hardly mixes with the heat storage material 2 is provided inside the heat storage tank 3. The exfoliating material 102 is provided preferably such that the exfoliating material 102 covers the cooling side heat exchanger 4 arranged inside the heat storage tank 3. As the exfoliating material 102, it is required to use the material that is in a liquid phase within the range of the heat storage temperature. The heat storage system 101 satisfies the following relationship:

The specific gravity of the heat storage material 2 in the solid phase>the specific gravity of the heat storage material 2 in the liquid phase>the specific gravity of the exfoliating material 102

In the heat storage system 101, the solidification of the heat storage material 2 occurs on the interface between the exfoliating material 102 and the heat storage material 2. The adhesion force of the heat storage material 2 in the solid phase, which deposits (precipitates) on the interface, is small, thus the deposited (precipitated) heat storage material 2 in the solid phase easily settles out. Where appropriate, the circulating pump 72 or the bubble generation device 76 may be configured to stir the heat storage material 2.

The wall surface of the heat storage tank 3 contacting the interface between the exfoliating material 102 and the heat storage material 2 is easily to be cooled, and thus it is assumed that the heat storage material 2 in the solid phase adheres to the wall surface of the heat storage tank 3. Therefore, preferably, the wall surface of the heat storage tank 3 contacting the interface between the exfoliating material 102 and the heat storage material 2 is heated. Heating of the wall surface of the heat storage tank 3 may be carried out by the wall surface heater 62, or alternatively, another heating means other than the wall surface heater 62.

The total volume of the heat storage material 2 varies depending on the solid phase rate. Therefore, it is preferable to determine the amount of the heat storage material 2 and the exfoliating material 102 both contained inside the heat storage tank 3 such that they can cover the whole cooling side heat exchanger 4 even when the solid phase rate varies within the range of the heat storage temperature.

Also, it is possible to arrange the cooling side heat exchanger 4 outside the exfoliating material 102. However, in this case, when the volume variation of the heat storage material 2 is large, then the cooling side heat exchanger 4 is separated from the exfoliating material 102 so that the heat transfer to the heat storage material 2 is likely to be deteriorated. In contrast, as the cooling side heat exchanger 4 is arranged inside the exfoliating material 102, as is in the heat storage system 101, it is possible to suppress the deterioration of the heat transfer efficiency even when the volume variation of the heat storage material 2 is large.

Figure 11:
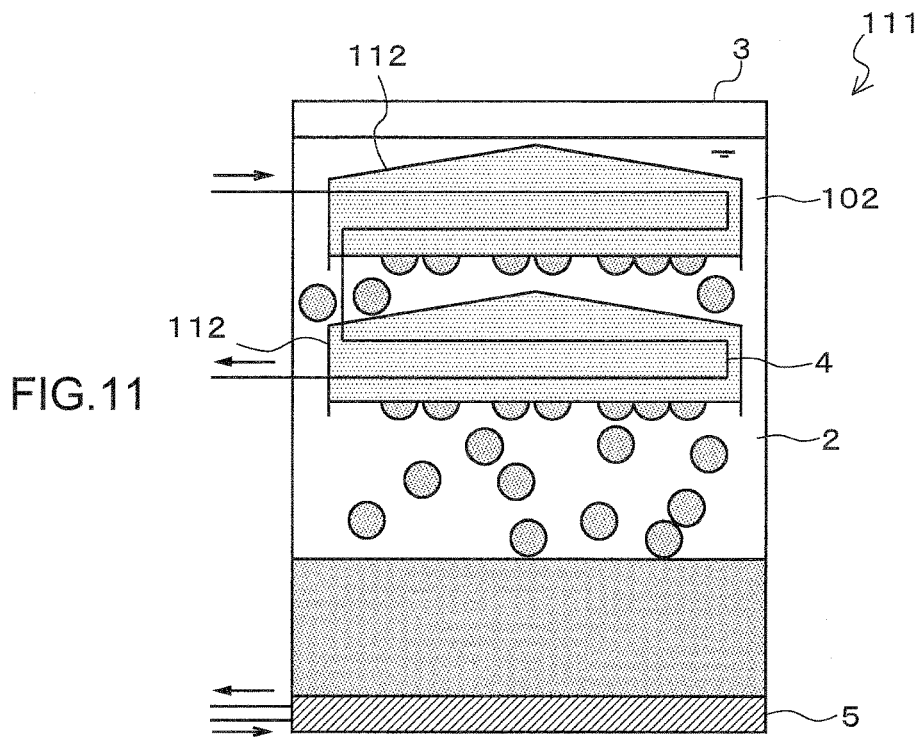
FIG. 11 is a schematic view of one modification to the heat storage system in FIG. 10.

Also, as shown in the heat storage system 111 in FIG. 11, a plurality of exfoliating material containers 112 may be provided that is closed upwardly and laterally, while open downwardly, and contains the exfoliating material 102 in a space inside. With employing this configuration, the contact area between the exfoliating material 102 and the heat storage material 2 may become larger, and the heat transfer efficiency may become higher. Although the heat storage system 111 is shown as including two exfoliating material containers 112, as a matter of course, three of more exfoliating material containers 112 may be provided instead.

Preferably, an upper surface of the exfoliating material container 112 is inclined so that the heat storage material 2 in the solid phase does not deposit on the upper surface of the exfoliating material container 112.

Also, in the heat storage system 111, the pipe (piping, pipe fitting) of the cooling side heat exchanger 4 is exposed between exfoliating material containers 112. Therefore, it is preferable to suppress the adhesion of the heat storage material 2 by, for example, providing a heat insulating material or the like in the exposed portion for keeping warm.

Figure 13A:
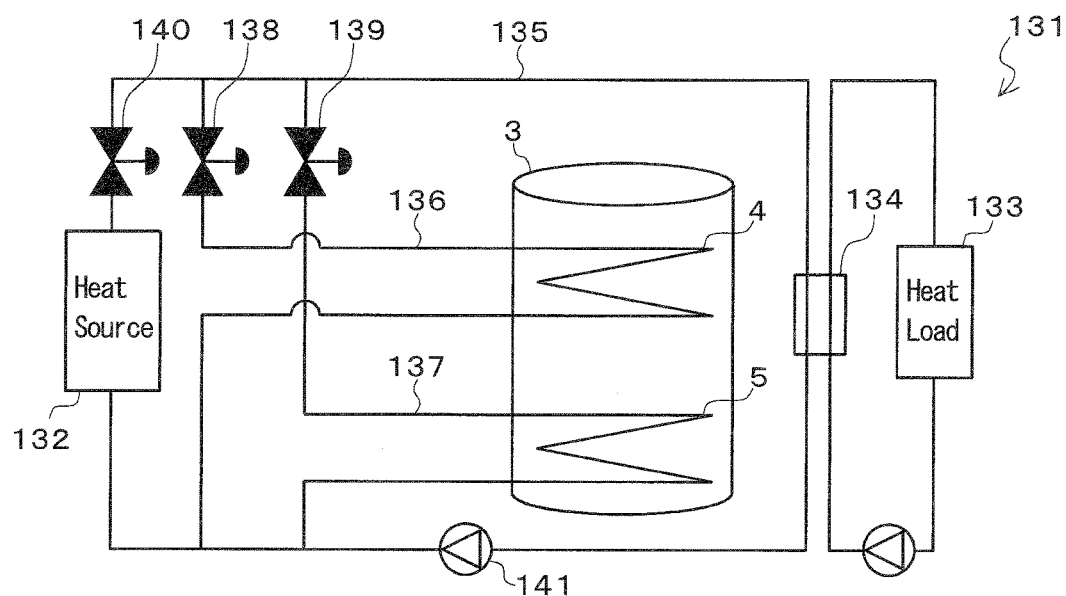
FIG. 13a is a schematic view of a heat storage system according to yet another embodiment of the present disclosure.

The heat storage system 131 shown in FIG. 13a, in the heat storage system 1 shown in FIG. 1a, is configured such that, when heating the heat storage material 2, introduces the heat medium at high temperature also to the upper section of the cooling side heat exchanger 4, and the heat storage material 2 is heated by both the cooling side heat exchanger 4 and the heating side heat exchanger 5.

The heat storage system 131 has a heat medium circulating line 135 for circulating the heat medium between a heat source 132 and the heat exchanger 134 at the side of a heat load 133. A cooling side heat exchanger line 136 and a heating side heat exchanger line 137 are configured to be connected such that the upstream side and the downstream side of the heat source 132 in the heat medium circulating line 135 is connected. The cooling side heat exchanger 4 is arranged on the cooling side heat exchanger line 136, while the heating side heat exchanger 5 is arranged on the heating side heat exchanger line 137. The heat source 132 is, for example, such as industrial exhaust heat or solar heat or the like. The heat load 133 is, for example, such as a steam turbine for the power generation or the like.

The cooling side heat exchanger line 136 is provided with a flow rate regulating valve 138 for regulating a flow rate of the heat medium flowing in the cooling side heat exchanger line 136. Likewise, the heating side heat exchanger line 137 is provided with a flow rate regulating valve 139 for regulating a flow rate of the heat medium flowing in the heating side heat exchanger line 137. Furthermore, on the heat medium circulating line 135 at the side of heat source 132 than a branch portion to the cooling side heat exchanger line 136 and the heating side heat exchanger line 137, a flow rate regulating valve 140 is provided for regulating the flow rate of the heat medium flowing in the heat source 132. The heat storage system 131 is configured such that common heat medium is supplied to the cooling side heat exchanger 4 and the heating side heat exchanger 5.

The flow rate regulating valves 138 to 140 are connected to a controller (not shown), and configured such that respective apertures are controlled by the controller. On the heat medium circulating line 135 at the side of heat exchanger 134 than a branch portion to the cooling side heat exchanger line 136 and the heating side heat exchanger line 137, a pump 141 for circulating the heat medium is provided.

Figure 13B:
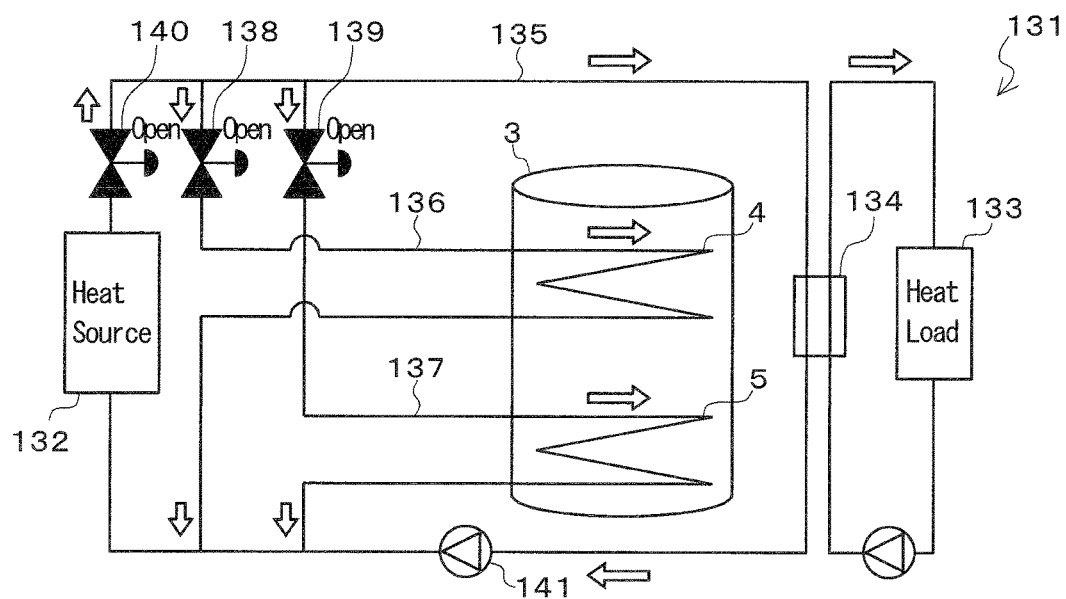
FIG. 13b is a view showing a flow of a heat medium when storing heat.

As shown in FIG. 13b, when heating the heat storage material 2, in other words, when storing heat, all of the flow rate regulating valves 138 to 140 are opened, and the heat medium, which is heated by the heat source 132 and becomes at high temperature, is introduced into both the cooling side heat exchanger 4 and the heating side heat exchanger 5, and the heat storage material 2 is heated by the both heat exchangers.

Figure 13C:
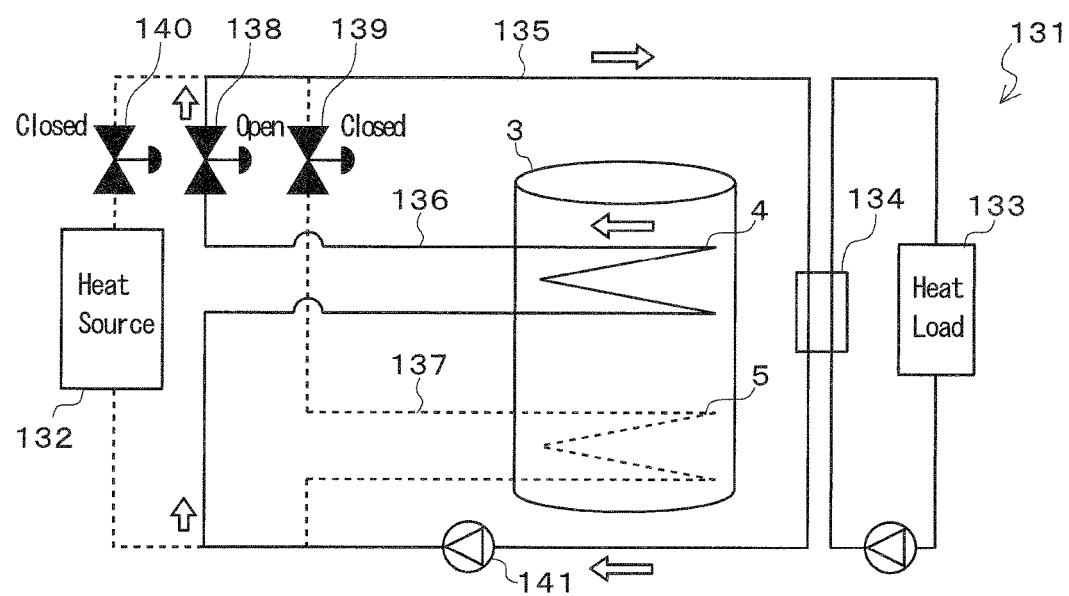
FIG. 13c is a view showing a flow of the heat medium when utilizing heat.

On the other hand, as shown in FIG. 13c, when cooling the heat storage material 2, in other word, when utilizing heat, only the flow rate regulating valve 138 provided on the cooling side heat exchanger line 136 is opened, while other flow rate regulating valves 139 and 140 are closed. By doing this, the heat medium, which is cooled by the heat exchanger 134 and becomes at low temperature, is introduced into the cooling side heat exchanger 4, cools the heat storage material 2, and simultaneously heats the heat medium.

In the heat storage system 131, as the heat storage material 2 is heated by both of the cooling side heat exchanger 4 and the heating side heat exchanger 5, it is possible to heat the heat storage material 2 in an efficient manner. Accordingly, the heat storage material 2 adhered to the cooling side heat exchanger 4 can be also easily melted.

The present disclosure should not limited to those described above, and it is apparent that various modifications can be added without departing from the scope of the present disclosure.

For example, although in the above described embodiments, as one example, the case in which the two component mixed salt with the amorphous composition is used as the heat storage material 2, the possible heat storage material 2 is not limited to the above described one. For example, the eutectic composition may be used, and the mixed salt of three components or more may be used. Further, instead of the molten salt, all substances capable of phase change may be used as the heat storage material 2.

Figure 14A:
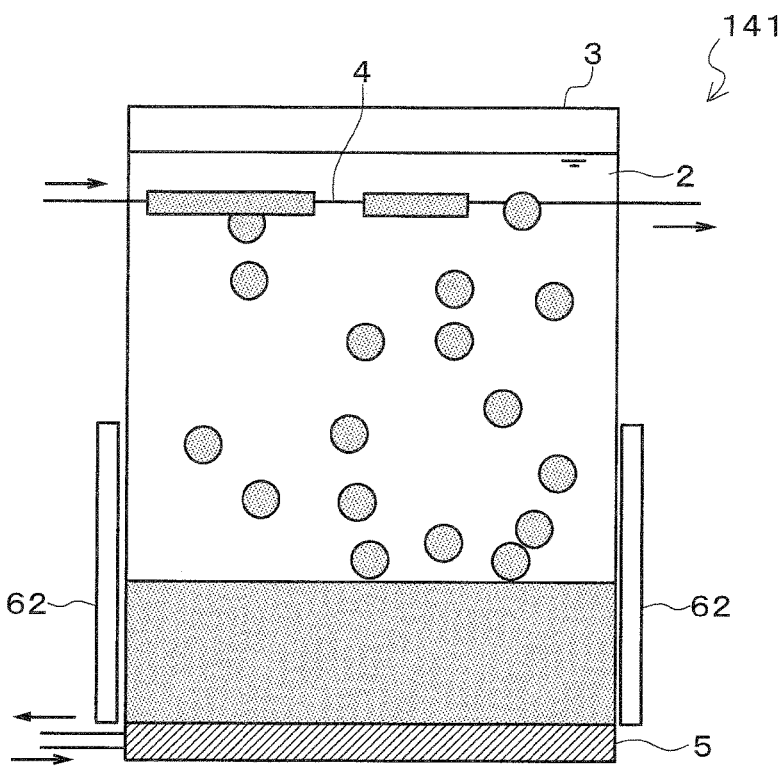
FIGS. 14a and 14b are view of a heat storage system according to one modification to the present disclosure.
Figure 14B:
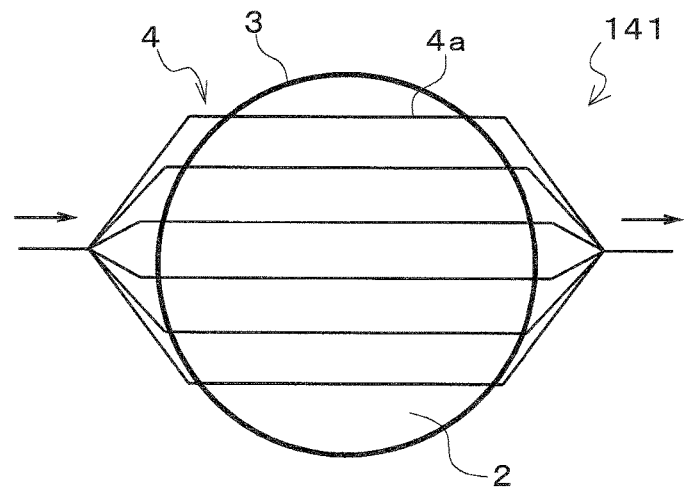

Also, although in the above described embodiments, the case in which the cooling side heat exchanger 4 is configured with bending one heat transfer tube 4a, alternatively, as shown in FIGS. 14a and 14b, it is possible to configure the cooling side heat exchanger 4 such that a plurality of heat transfer tubes 4a are connected in parallel. With employing this configuration, it is possible to increase the flow rate of the first heat medium at low temperature significantly, therefore it is possible to reduce the temperature difference between the inlet and the outlet of the first heat medium. As a result, the heat storage material 2 in the solid phase can occur in a uniformed manner when it is cooled by the cooling side heat exchanger 4, therefore the heat storage material 2 is more easily to exfoliate.

Also, when the whole heat storage material 2 is incidentally solidified due to some sort of trouble or the like, in order to avoid the deformation or the damager of the heat transfer tube 4a by the solidified heat storage material 2 taking in the heat transfer tube 4a of the cooling side heat exchanger 4, the cooling side heat exchanger 4 may be also arranged such that the heat transfer tube 4a is exposed from the heat storage material 2 when the whole heat storage material 2 is solidified.

However, in the condition in which the cooling side heat exchanger 4 is completely exposed, the heat storage material 2 cannot be heated by way of supplying the heat medium at high temperature to the cooling side heat exchanger 4. Thus, in case that, as shown in FIGS. 13a-13c, the heat medium at high temperature is capable of being supplied to the cooling side heat exchanger 4, it is preferable to arrange the cooling side heat exchanger 4 such that a part of the heat transfer tube 4a is exposed from the heat storage material 2 when the whole heat storage material 2 is solidified, in other words, at least a part of the heat transfer tube 4a contacts the heat storage material 2 in the solid phase.

Likewise, the cooling side heat exchanger 4 may be configured such that a plurality of heat transfer tubes 4a are joined with flexible tubes, and a stress applied to the heat transfer tube 4a can be dispersed when the heat storage material 2 in the solid phase is adhered to the heat transfer tube 4a. With employing the configuration above, it is possible to suppress the deformation or the damage of the heat transfer tube 4a.

As such, according to the present disclosure, a heat storage system is provided that is capable of being manufactured at lower cost and also has higher heat transfer efficiency.

A second aspect of the present disclosure provides the heat storage system according to the first aspect of the present disclosure, wherein the heat storage material is a mixed salt with an amorphous composition that becomes a solid-liquid coexisting state at a minimum temperature of the heat storage $T_{min}$.

A wall surface heater may be provided for heating a side wall of the heat storage tank.

A third aspect of the present disclosure provides the heat storage system according to the first or second aspect of the present disclosure, further comprising an auxiliary heater provided at a lower section inside the heat storage tank for forming a fluid passage for allowing the heat storage material, which becomes the liquid phase from the solid phase due to heating by the heating side heat exchanger, to escape upwardly.

A fourth aspect of the present disclosure provides the heat storage system according to any one of the first to third aspects of the present disclosure, wherein the heating side heat exchanger is a plate-like heat exchanger arranged at a bottom surface of the heat storage tank inside which a flow channel for flowing a heat medium for heating is arranged.

A fifth aspect of the present disclosure provides the heat storage system according to any one of the first to fourth aspects of the present disclosure, wherein the cooling side heat exchanger has a cooling surface made of glass.

A sixth aspect of the present disclosure provides the heat storage system according to any one of the first to fifth aspects of the present disclosure, further comprising a solid phase exfoliation unit for exfoliating the heat storage material, which is cooled by the cooling side heat exchanger and becomes the solid phase, from the cooling side heat exchanger.

A seventh aspect of the present disclosure provides the heat storage system according to the sixth aspect of the present disclosure, wherein the solid phase exfoliation unit is provided with a circulating pump for suctioning the heat storage material in the liquid phase in the heat storage tank, discharging (dispensing) the suctioned heat storage material into the heat storage tank, and flowing the heat storage material so as to allow the heat storage material, which becomes the solid phase, to exfoliate from the cooling side heat exchanger.

An eighth aspect of the present disclosure provides the heat storage system according to the sixth or seventh aspect of the present disclosure, wherein the solid phase exfoliation unit is provided with a bubble generation device for generating bubble below the cooling side heat exchanger inside the heat storage tank, and allowing the heat storage material, which becomes the solid phase, to exfoliate from the cooling side heat exchanger by the generated bubble.

An ninth aspect of the present disclosure provides the heat storage system according to any one of the sixth to eighth aspects of the present disclosure, wherein the cooling side heat exchanger is formed by a heat transfer tube for flowing a heat medium for cooling, and the solid phase exfoliation unit comprises a slide plate in which a heat transfer tube insertion hole for inserting the heat transfer tube is formed, and an actuator for slidably translating the slide plate in a longitudinal direction of the heat transfer tube inserted in the heat transfer tube insertion hole so as to allow the heat storage material in the solid phase, which adheres to a surface of the heat transfer tube, to exfoliate.

A tenth aspect of the present disclosure provides the heat storage system according to any one of the sixth to ninth aspects of the present disclosure, wherein the solid phase exfoliation unit comprises a solid piece which is added to the heat storage material for colliding with the cooling side heat exchanger due to a flow of the heat storage material in the liquid phase, and allowing the heat storage material, which becomes the solid phase, to exfoliate from the cooling side heat exchanger.

An eleventh aspect of the present disclosure provides the heat storage system according to any one of the first to fifth aspects of the present disclosure, further comprising an exfoliation (exfoliating) material in a liquid phase provided inside the heat storage tank that has a lower specific gravity than the heat storage material in the liquid phase and does not immingle with the heat storage material, and the exfoliation material being arranged such that the cooling side heat exchanger arranged inside the heat storage tank is covered by the exfoliation material.

A twelfth aspect of the present disclosure provides the heat storage system according to any one of the first to eleventh aspects of the present disclosure, wherein the heat medium at high temperature is introduced into the cooling side heat exchanger when heating the heat storage material, and the heat storage material is heated by both the cooling side heat exchanger and the heating side heat exchanger.

The embodiments of the present disclosure are not limited to those described above. The present disclosure includes any variations, applied examples, and equivalents embraced in the concepts of the present disclosure defined by the claims. Thus, the present disclosure should not be interpreted in a limited manner, but is applicable to any other technique falling within the scope of the concepts of the present disclosure.

REFERENCE SIGNS LIST

1 Heat Storage System
2 Heat Storage Material
3 Heat Storage Tank
4 Cooling Side Heat Exchanger
5 Heating side Heat Exchanger
62 Wall Surface Heater

What is claimed is:

1. A heat storage system, comprising:
   a heat storage material having a higher specific gravity in a solid phase than in a liquid phase;
   a heat storage tank for containing the heat storage material;
   a cooling side heat exchanger arranged at an upper section inside the heat storage tank and for cooling the heat storage material;
   a heating side heat exchanger arranged at a lower section inside the heat storage tank and for heating the heat storage material;
   a wall surface heater for heating a side wall of the heat storage tank,
   wherein heat medium at high temperature is introduced into the cooling side heat exchanger when heating the heat storage material, and the heat storage material is heated by both the cooling side heat exchanger and the heating side heat exchanger;
   a heat medium circulating line for circulating the heat medium between a heat source and a heat exchanger at a side of a heat load;
   a cooling side heat exchanger line configured to connect the upstream side and the downstream side of the heat source in the heat medium circulating line, on which the cooling side heat exchanger is arranged;
   a heating side heat exchanger line configured to connect the upstream side and the downstream side of the heat source in the heat medium circulating line, on which the heating side heat exchanger is arranged;
   a first flow rate regulating valve provided on the cooling side heat exchanger line;
   a second flow rate regulating valve provided on the heating side heat exchanger line; and
   a third flow rate regulating valve provided on the heat medium circulating line at the same side of the heat source as a branch portion to the cooling side heat exchanger line and the heating side heat exchanger line,
   wherein when heating the heat storage material, the first flow rate regulating valve, the second flow rate regulating valve and the third flow rate regulating valve are opened, and the heat medium, which is heated by the heat source and becomes at high temperature, is introduced into both the cooling side heat exchanger and the heating side heat exchanger, and the heat storage material is heated by both the cooling side heat exchanger and the heating side heat exchanger.

2. The heat storage system according to claim 1, wherein when cooling the heat storage material, the first flow rate regulating valve is opened, while the second flow rate regulating valve and the third flow rate regulating valve are closed, and the heat medium, which is cooled by the heat exchanger at the side of the heat load and becomes at low temperature, is introduced into the cooling side heat exchanger, cools the heat storage material, and simultaneously heats the heat medium.

* * * * *